United States Patent
Wang et al.

(10) Patent No.: US 7,399,376 B2
(45) Date of Patent: *Jul. 15, 2008

(54) POLARIZING PLATE LAMINATED WITH AN IMPROVED GLUE COMPOSITION AND A METHOD OF MANUFACTURING THE SAME

(75) Inventors: Yongcai Wang, Webster, NY (US);
Robert E. McCovick, Hilton, NY (US);
Daniel T. Linehan, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 509 days.

This patent is subject to a terminal disclaimer.

(21) Appl. No.: 11/028,036

(22) Filed: Jan. 3, 2005

(65) Prior Publication Data

US 2005/0249932 A1    Nov. 10, 2005

Related U.S. Application Data

(63) Continuation-in-part of application No. 10/838,841, filed on May 4, 2004, now Pat. No. 7,252,733.

(51) Int. Cl.
*C09J 5/02* (2006.01)
*B32B 37/00* (2006.01)

(52) U.S. Cl. .............. 156/307.3; 156/308.6; 156/324.4; 359/490; 359/500

(58) Field of Classification Search .............. 156/307.3, 156/308.6, 324.4; 359/483, 485
See application file for complete search history.

(56) References Cited

U.S. PATENT DOCUMENTS

| | | | |
|---|---|---|---|
| 2,143,791 A | 1/1939 | Nadeau | |
| 2,362,580 A | 11/1944 | Nadeau et al. | |
| 4,619,793 A * | 10/1986 | Lee | 264/2.6 |
| 6,840,635 B2 * | 1/2005 | Maeda et al. | 359/512 |
| 2002/0145801 A1 * | 10/2002 | Tsuchimoto et al. | 359/485 |
| 2003/0096093 A1 * | 5/2003 | Sakamaki | 428/220 |
| 2003/0215621 A1 | 11/2003 | Bermel | |

FOREIGN PATENT DOCUMENTS

| | | | |
|---|---|---|---|
| GB | 1 450 012 | | 9/1976 |
| JP | 06094915 | | 3/2002 |
| JP | 2002090546 | * | 3/2002 |

OTHER PUBLICATIONS

Machin Translation for JP 2002090546 Aug. 2007.*
Machine Translation for JP 06094915 Aug. 2007.*
Abstract for JP 06094915, date unknown.*

* cited by examiner

*Primary Examiner*—John L Goff
(74) *Attorney, Agent, or Firm*—Chris Konkol

(57) ABSTRACT

The present invention generally relates a method of forming a polarizing plate comprising providing two protective cover sheets, each protective cover sheet for polarizers comprising a low birefringence protective polymer film and a layer promoting adhesion to poly(vinyl alcohol)-containing films comprising a hydrophilic polymer. The cover sheets are brought into contact with a PVA dichroic polarizing film such that said layer promoting adhesion to poly(vinyl alcohol)-containing films in each of said two cover sheets is in contact with said PVA dichroic polarizing film. A glue composition is applied just before contacting said PVA dichroic polarizing film and said cover sheets, said glue composition being substantially free of dissolved polymer and comprising a crosslinking agent that crosslinks PVA.

7 Claims, 7 Drawing Sheets

POLARIZING PLATE LAMINATED WITH AN IMPROVED GLUE COMPOSITION AND A METHOD OF MANUFACTURING THE SAME

CROSS REFERENCE TO RELATED APPLICATIONS

This is a continuation-in-part of application Ser. No. 10/838,841 filed 4 May 2004 entitled "POLARIZER GUARDED COVER SHEET WITH ADHESION PROMOTER" by Wang et al, now U.S. Pat. No. 7,252,733.

FIELD OF THE INVENTION

The present invention relates to polarizer plates, an improved method for producing polarizing plates, and a Liquid Crystal Display employing the same. More particularly, the invention relates to polarizing plates comprising a protective cover sheet comprising a low birefringence protective polymer film and a layer that promotes adhesion to poly(vinyl alcohol), wherein the protective cover sheet is laminated to a polarizing film employing a specially adapted glue composition.

BACKGROUND OF THE INVENTION

Transparent resin films are used in a variety of optical applications. For example, a number of different optical elements in Liquid Crystal Displays ("LCDs") may be formed from resin films. The structure of LCDs may include a liquid crystal cell, one or more polarizer plates, and one or more light management films. Liquid crystal cells are formed by confining liquid crystals such as vertically-aligned (VA), in-plane switching (IPS), twisted nematic (TN) or super twisted nematic (STN) materials between two electrode substrates. Polarizer plates are typically a multi-layer element comprising resin films. In particular, a polarizer plate can comprise a polarizing film sandwiched between two protective cover sheets that comprise a low birefringence protective polymer film.

Polarizing films are normally prepared from a transparent and highly uniform, amorphous resin film that is subsequently stretched to orient the polymer molecules and then stained with a dye to produce dichroic film. An example of a suitable resin for the formation of polarizer films is fully hydrolyzed poly(vinyl alcohol) (PVA). Because the stretched PVA films used to form polarizers are very fragile and dimensionally unstable, protective cover sheets are normally laminated to both sides of the PVA film to offer both support and abrasion resistance.

Protective cover sheets used in polarizer plates are required to have high uniformity, good dimensional and chemical stability, and high transparency. Originally, protective cover-sheets were formed from glass, but a number of resin films are now used to produce lightweight and flexible polarizers. Many resins have been suggested for use in protective cover sheets including cellulosics such as cellulose esters, acrylics such as poly(methyl methacrylate), cyclic polyolefin, polycarbonates, and sulfones. However, acetyl cellulose polymers are most commonly used in protective cover sheets for polarizer plates. Polymers of the acetyl cellulose type are commercially available in a variety of molecular weights as well as the degree of acyl substitution of the hydroxyl groups on the cellulose backbone. Of these, the fully substituted polymer, triacetyl cellulose (TAC) is commonly used to manufacture resin films for use in protective cover sheets for polarizer plates.

The cover sheet normally requires a surface treatment to insure good adhesion to the PVA dichroic film. When TAC is used as the protective cover film of a polarizer plate, the TAC film is subjected to treatment in an alkali bath to saponify the TAC surface to provide suitable adhesion to the PVA dichroic film. The alkali treatment uses an aqueous solution containing a hydroxide of an alkali metal, such as sodium hydroxide or potassium hydroxide. After alkali treatment, the cellulose acetate film is typically washed with weak acid solution followed by rinsing with water and drying. This saponification process is both messy and time consuming.

U.S. Pat. No. 2,362,580 describes a laminar structure wherein two cellulose ester films each having a surface layer containing cellulose nitrate and a modified PVA is adhered to both sides of a PVA film. JP 06094915A discloses a protective film for polarizer plates wherein the protective film has a hydrophilic layer which provides adhesion to PVA film. Commonly-assigned, copending U.S. patent application Ser. No. 10/838,841, filed May 4, 2004 describes a guarded protective cover sheet having a removable, carrier substrate and a cover sheet comprising a low birefringence protective polymer film and a layer promoting adhesion to poly(vinyl alcohol) on the same side of the carrier substrate as the low birefringence protective polymer film which eliminates the need for the saponification process.

Protective cover sheets may be a composite or multilayer film including other functional layers (herein also referred to as auxiliary layers) such as an antiglare layer, antireflection layer, anti-smudge layer, compensation layer, or antistatic layer. Generally, these functional layers are applied in a process step that is separate from the manufacture of the low-birefringence protective polymer film, but may be later applied to form a composite film. A functional or auxiliary film may combine functions of more than one functional layer, or a protective polymer film may also serve the function of a functional layer.

For example, some LCD devices may contain a low birefringence protective polymer film that also serves as a compensation film to improve the viewing angle of an image. Compensation films (i.e. retardation films or phase difference films) are normally prepared from amorphous films that have a controlled level of birefringence prepared, for example, either by uniaxial stretching or by coating with discotic dyes. Suitable resins suggested for formation of compensation films by stretching include poly(vinyl alcohol)s, polycarbonates and sulfones. Compensation films prepared by treatment with dyes normally require highly transparent films having low birefringence such as TAC and cyclic olefin polymers.

In general, resin films as described above are prepared either by melt extrusion methods or by casting methods. Melt extrusion methods involve heating the resin until molten (approximate viscosity on the order of 100,000 cp), then applying the hot molten polymer to a highly polished metal band or drum with an extrusion die, cooling the film, and finally peeling the film from the metal support. For several reasons, however, films prepared by melt extrusion are generally not suitable for optical applications. Principal among these is the fact that melt extruded films exhibit a high degree of optical birefringence. In the case of highly substituted cellulose acetate, there is the additional problem of melting the polymer. Cellulose triacetate has a very high melting temperature of 270-300° C., and this is above the temperature where decomposition begins. Films have been formed by melt extrusion at lower temperatures by compounding cellulose acetate with various plasticizers as taught in U.S. Pat. No. 5,219,510 to Machell. However, the polymers described in U.S. Pat. No. 5,219,510 to Machell are not the fully substituted cellulose triacetate, but rather have a lesser degree of alkyl substitution or have propionate groups in place of some acetate groups. Even so, melt extruded films of cellulose acetate are known to exhibit poor flatness as noted in U.S. Pat. No. 5,753,140 to Shigenmura. For these reasons, melt extrusion methods are generally not practical for fabricating many resin films including cellulose triacetate films used to prepare protective covers and substrates in electronic displays. Rather, casting methods are generally preferred to manufacture these films.

Resin films for optical applications are manufactured almost exclusively by casting methods. Casting methods involve first dissolving the polymer in an appropriate solvent to form a dope having a high viscosity on the order of 50,000 cp, and then applying the viscous dope to a continuous highly polished metal band or drum through an extrusion die, partially drying the wet film, peeling the partially dried film from the metal support, and conveying the partially dried film through an oven to more completely remove solvent from the film. Cast films typically have a final dry thickness in the range of 40-200 microns. In general, thin films of less than 40 microns are very difficult to produce by casting methods due to the fragility of wet film during the peeling and drying processes. Films having a thickness of greater than 200 microns are also problematic to manufacture due to difficulties associated with the removal of solvent in the final drying step. Although the dissolution and drying steps of the casting method add complexity and expense, cast films generally have better optical properties when compared to films prepared by melt extrusion methods and, moreover, problems related to decomposition associated with exposure to high temperature are avoided.

Examples of optical films prepared by casting methods include: (1) Cellulose acetate sheets used to prepare light polarizing films as disclosed in U.S. Pat. No. 4,895,769 to Land and U.S. Pat. No. 5,925,289 to Cael as well as more recent disclosures in U.S. Patent Application 2001/0039319 A1 to Harita and U.S. Patent Application 2002/001700 A1 to Sanefuji; (2) Cellulose triacetate sheets used for protective covers for light polarizing films as disclosed in U.S. Pat. No. 5,695,694 to Iwata; (3) Polycarbonate sheets used for protective covers for light polarizing films or for retardation plates as disclosed in U.S. Pat. No. 5,818,559 to Yoshida and U.S. Pat. Nos. 5,478,518 and 5,561,180 both to Taketani; and (4) Polyethersulfone sheets used for protective covers for light polarizing films or for retardation plates as disclosed in U.S. Pat. Nos. 5,759,449 and 5,958,305 both to Shiro.

Despite the wide use of the casting method to manufacture optical films, however, there are a number of disadvantages to casting technology. One disadvantage is that cast films have significant optical birefringence. Birefringence in cast or coated films arises from orientation of polymers during the manufacturing operations. This molecular orientation causes indices of refraction within the plane of the film to be measurably different. In-plane birefringence is the difference between these indices of refraction in perpendicular directions within the plane of the film. The absolute value of birefringence multiplied by the film thickness is defined as in-plane retardation. Therefore, in-plane retardation is a measure of molecular anisotropy within the plane of the film.

During a casting process, molecular orientation may arise from a number of sources including shear of the dope in the die, shear of the dope by the metal support during application, shear of the partially dried film during the peeling step, and shear of the free-standing film during conveyance through the final drying step. These shear forces orient the polymer molecules and ultimately give rise to undesirably high birefringence or retardation values. To minimize shear and obtain the lowest birefringence films, casting processes are typically operated at very low line speeds of 1-15 m/min as disclosed in U.S. Pat. No. 5,695,694 to Iwata. Slower line speeds generally produce the highest quality films.

Although films prepared by casting methods have lower birefringence compared to films prepared by melt extrusion methods, birefringence remains objectionably high. For example, cellulose triacetate films prepared by casting methods exhibit in-plane retardation of 7 nanometers (nm) for light in the visible spectrum as disclosed in U.S. Pat. No. 5,695,694 to Iwata. Polycarbonate films prepared by casting methods exhibit in-plane retardation of 17 nm as disclosed in U.S. Pat. Nos. 5,478,518 and 5,561,180 both to Taketani. U.S. Patent Application Publication 2001/0039319 A1 to Harita claims that color irregularities in stretched cellulose acetate sheets are reduced when the difference in retardation between widthwise positions within the film is less than 5 nm in the original unstretched film.

For many applications of optical films, low in-plane retardation values are desirable. In particular, values of in-plane retardation of less than 10 nm are preferred.

Commonly-assigned U.S. Patent Application Publications 2003/0215658A, 2003/0215621A, 2003/0215608A, 2003/0215583A, 2003/0215582A, 2003/0215581A, and 2003/0214715A describe a coating method to prepare resin films having low birefringence that are suitable for optical applications. The resin films are applied onto a discontinuous, removable carrier substrate from lower viscosity polymer solutions than are normally used to prepare cast films.

Another drawback to the casting method is the inability to accurately apply multiple layers. As noted in U.S. Pat. No. 5,256,357 to Hayward, conventional multi-slot casting dies create unacceptably non-uniform films. In particular, line and streak non-uniformity is greater than 5% with prior art devices. Acceptable two layer films may be prepared by employing special die lip designs as taught in U.S. Pat. No. 5,256,357 to Hayward, but the die designs are complex and may be impractical for applying more than two layers simultaneously.

Another drawback to the casting method is the restrictions on the viscosity of the dope. In casting practice, the viscosity of dope is on the order of 50,000 cp. For example, U.S. Pat. No. 5,256,357 to Hayward describes practical casting examples using dopes with a viscosity of 100,000 cp. In general, cast films prepared with lower viscosity dopes are known to produce non-uniform films as noted for example in U.S. Pat. No. 5,695,694 to Iwata. In U.S. Pat. No. 5,695,694 to Iwata, the lowest viscosity dopes used to prepare casting samples are approximately 10,000 cp. At these high viscosity values, however, casting dopes are difficult to filter and degas. While fibers and larger debris may be removed, softer materials such as polymer slugs are more difficult to filter at the high pressures found in dope delivery systems. Particulate and bubble artifacts create conspicuous inclusion defects as well as streaks which may result in substantial waste.

In addition, the casting method can be relatively inflexible with respect to product changes. Because casting requires high viscosity dopes, changing product formulations requires extensive down time for cleaning delivery systems to eliminate the possibility of contamination. Particularly problematic are formulation changes involving incompatible polymers and solvents. In fact, formulation changes are so time consuming and expensive with the casting method that most production machines are dedicated exclusively to producing only one film type.

Cast films may exhibit undesirable cockle or wrinkles. Thinner films are especially vulnerable to dimensional artifacts either during the peeling and drying steps of the casting process or during subsequent handling of the film. Very thin films are difficult to handle during this lamination process without wrinkling. In addition, many cast films may naturally become distorted over time due to the effects of moisture.

For optical films, good dimensional stability is necessary during storage as well as during subsequent fabrication of polarizer plates. In addition, resin films used in protective cover sheets for polarizer plates are susceptible to scratch and abrasion, as well as the accumulation of dirt and dust, during the manufacture and handling of the cover sheet. The preparation of high quality polarizer plates for display applications requires that the protective cover sheet be free of defects due to physical damage or the deposition of dirt and dust.

It would be very advantageous to avoid the need for saponification of protective cover sheets in the preparation of polarizer plates from resin films which requires a lamination process involving pretreatment in an alkali bath and then application of adhesives, pressure, and high temperatures. Avoiding such a saponification operation would improve both productivity and reduce the necessary conveyance and handling of the sheets. Although advantageous for protective cover sheets in general, this would be especially desirable for relatively thinner protective cover sheets.

SUMMARY OF THE INVENTION

It is an object of the present invention to overcome the limitations of making prior-art polarizer plates and to provide an improved method sheet that eliminates the need for complex surface treatments such as saponification prior to the fabrication of the polarizer plates.

It is another object to provide an improved method in which the cover sheets are less susceptible to physical damage such as scratch and abrasion and are more dimensionally stable during their manufacture, storage, and final handling steps necessary in the fabrication of polarizer plates.

It is a further object to provide an improved process for the fabrication of polarizer plates using a glue composition in combination with novel cover sheets.

These and other objects of the invention are accomplished by a method of forming a polarizing plate comprising providing two protective cover sheets, each protective cover sheet comprising a low birefringence protective polymer film and a layer promoting adhesion to poly(vinyl alcohol)-containing films comprising a hydrophilic polymer. The cover sheets are brought into contact with a PVA dichroic polarizing film such that said layer promoting adhesion to poly(vinyl alcohol)-containing films in each of said two cover sheets is in contact with said PVA dichroic polarizing film. A glue composition is to both sides of said PVA dichroic polarizing film or to the lowermost layer of said cover sheets, the glue composition being substantially free of dissolved polymer and comprising a crosslinking agent that crosslinks PVA.

The invention provides excellent adhesion between the poly(vinyl alcohol)-containing dichroic films and the cover sheets and eliminates the need to alkali treat the cover sheets prior to lamination to the dichroic films, thereby simplifying the process to manufacture polarizing plates.

Optionally, auxiliary layers that include an abrasion-resistant layer, antiglare layer, low reflection layer, antireflection layer, antistatic layer, viewing angle compensation layer, and moisture barrier layer may be employed in the cover sheets of the invention.

In one embodiment of the invention, the manufacture of very thin cover sheets is facilitated by applying the cover sheet coating formulation onto a discontinuous carrier substrate that supports the wet cover sheet film through the drying process and eliminates the need to peel the sheet from a metal band or drum prior to a final drying step as typically performed in the casting methods described in prior art. Rather, the cover sheet is substantially completely dried before separation from the carrier substrate. In fact, the composite comprising the cover sheet and carrier substrate are preferably wound into rolls and stored until needed for the fabrication of polarizer plates.

In accordance with another embodiment of the invention, therefore, the method of forming a polarizing plate comprises providing two guarded cover sheet composites each comprising a carrier substrate and a protective cover sheet, the latter comprising a low birefringence protective polymer film and a layer promoting adhesion to poly(vinyl alcohol)-containing films, the latter layer comprising a hydrophilic polymer, wherein the method further comprises bringing said cover sheets into contact with a PVA dichroic film such that the layer promoting adhesion to poly(vinyl alcohol) in each of said two cover sheets is in contact with the PVA dichroic film, and wherein a glue composition is applied to adhesively bond said PVA dichroic film and said cover sheet upon contact. This glue composition is substantially free of dissolved polymer and comprises a crosslinking agent that crosslinks PVA.

The invention also relates to a polarizing plate made in accordance with the present invention. Polarizing plates made in accordance with the present invention have been shown to exhibit improved interlayer dry adhesion and, when exposed to water, improved interlayer wet adhesion.

DETAILED DESCRIPTION OF THE INVENTION

Figure 1:
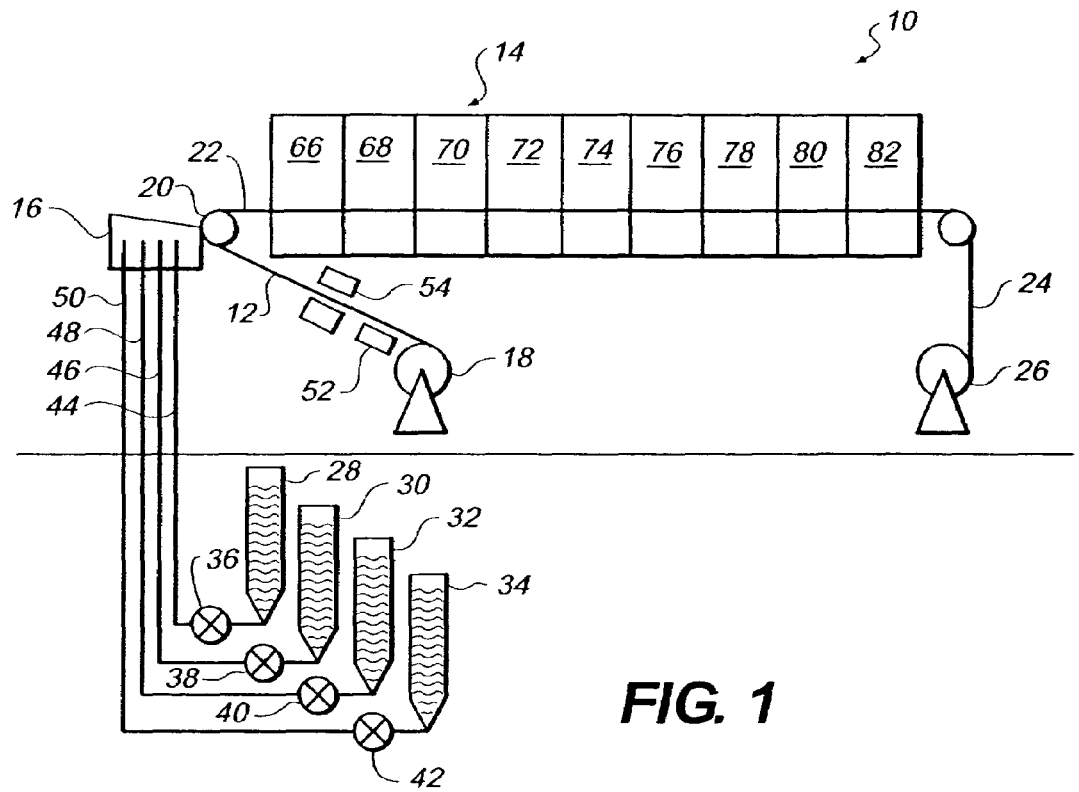
FIG. 1 is a schematic of an exemplary coating and drying apparatus that can be used in the practice of the method of the present invention.

The following definitions apply to the description herein:

In-plane phase retardation, $R_{in}$, of a layer is a quantity defined by $(n_x-n_y)d$, where $n_x$ and $n_y$ are indices of refraction in the direction of x and y; x is taken as the direction of maximum index of refraction in the x-y plane and y direction is taken perpendicular to it; the x-y plane is parallel to the surface plane of the layer; and d is a thickness of the layer in the z-direction. The quantity $(n_x-n_y)$ is referred to as in-plane birefringence, $\Delta n_{in}$. The value of $\Delta n_{in}$ is given at a wavelength $\lambda=550$ nm.

Out of-plane phase retardation, $R_{th}$, of a layer is a quantity defined by $[n_z-(n_x+n_y)/2]d$, where $n_z$ is the index of refraction in the z-direction. The quantity $[n_z-(n_x+n_y)/2]$ is referred to as out-of-plane birefringence, $\Delta n_{th}$. If $n_z>(n_x+n_y)/2$, $\Delta n_{th}$ is positive (positive birefringence), and thus the corresponding $R_{th}$ is also positive. If $n_z<(n_x+n_y)/2$, $\Delta n_{th}$ is negative (negative birefringence) and $R_{th}$ is also negative. The value of $\Delta n_{th}$ is given at $\lambda=550$ nm.

Intrinsic Birefringence $\Delta n_{int}$, of a polymer refers to the quantity defined by $(n_e-n_o)$, where $n_e$ and $n_o$ are the extraordinary and the ordinary index of the polymer, respectively. The actual birefringence (in-plane $\Delta n_{in}$ or out-of-plane $\Delta n_{th}$) of a polymer layer depends on the process of forming it, thus the parameter $\Delta n_{int}$.

Amorphous means a lack of long-range order. Thus an amorphous polymer does not show long-range order as measured by techniques such as X-ray diffraction.

Transmission is a quantity to measure the optical transmissivity. It is given by the percentile ratio of out coming light intensity $I_{out}$ to input light intensity $I_{in}$ as $I_{out}/I_{in} \times 100$.

Optic Axis refers to the direction in which propagating light does not see birefringence.

Uniaxial means that two of the three indices of refraction, nx, ny, and nz, are essentially the same.

Biaxial means that the three indices of refraction, nx, ny, and nz, are all different.

Acid number for a polymer is defined as the number of milligrams of KOH required to neutralize 1 gram of polymer solids.

Cover sheets employed in Liquid Crystal Displays are typically polymeric sheets having low optical birefringence that are employed on each side of a PVA dichroic film in order to maintain the dimensional stability of the PVA dichroic film and to protect it from moisture and UV degradation. In the following description a guarded cover sheet means a cover sheet that is disposed on a removable, protective carrier substrate. A strippable, protective film may also be employed on the side of the cover sheet opposite to the carrier substrate so that both sides of the cover sheet are protected prior to its use in a polarizer plate.

A layer promoting adhesion to PVA is a distinct layer that is applied in a coating step either separate from or simultaneous with the application of the low birefringence protective polymer film. The layer promoting adhesion to PVA provides acceptable adhesion of the cover sheet to a PVA dichroic film (in a liquid crystal display application) without the need for a wet pretreatment, such as saponification, of the cover sheet prior to lamination to the PVA film.

A tie layer is a distinct layer that is applied in a coating step either separate from or simultaneous with the application of the low birefringence protective polymer film or layer promoting adhesion to the PVA dichroic film.

As indicated above, the present invention is directed to a polarizing plate comprising a protective cover sheet for polarizers comprising a low birefringence protective polymer film and a layer promoting adhesion to poly(vinyl alcohol)-containing films that comprises a hydrophilic polymer, wherein the layer promoting adhesion to poly(vinyl alcohol)-containing films has been adhesively attached to a PVA dichroic film polarizer film by a glue composition that is substantially free of dissolved polymer and comprises a crosslinking agent that crosslinks PVA.

Polarizing plates are also referred to as polarizer plates or polarizers.

In a method of forming a polarizing plate in accordance with the present invention, two protective cover sheets are provided, each protective cover sheet comprising a low birefringence protective polymer film and a layer promoting adhesion to poly(vinyl alcohol)-containing films comprising a hydrophilic polymer. The cover sheets are brought into contact with a PVA dichroic polarizing film such that said layer promoting adhesion to poly(vinyl alcohol)-containing films in each of said two cover sheets is in contact with the PVA dichroic polarizing film. A glue composition is applied near when bringing together into contact said PVA dichroic polarizing film and said cover sheets. The glue composition is substantially free of dissolved polymer and comprises a crosslinking agent that crosslinks PVA. The crosslinking agent that crosslinks PVA may be an organic crosslinking agent, an inorganic crosslinking, or a combination of both.

The inorganic crosslinking agent can comprise multivalent ions selected from the group consisting of calcium, magnesium, barium, strontium, boron, beryllium, aluminum, iron, copper, cobalt, lead, silver, zirconium, and zinc ions. Other useful inorganic crosslinking agents include alkoxysilanes such as tetramethoxysilane, tetraethoxysilane, tetrabutoxysilane, and their hydrolyzed oligomers; organic titanates such as fetraalkyl titanates; titanate chelates such as acetylacetonate titanate chelate, lactic acid titanate chelate ammonium salt, and others; and organic zirconates such as tetralkyl zirconates.

In a particularly preferred embodiment, the glue composition comprises an inorganic crosslinking agent comprising a boron compound, for example, boric acid.

Organic crosslinking agents that crosslink PVA comprise compounds selected from the group consisting of melamine formaldehyde resins, glycoluril formaldehyde resins, polycarboxylic acids and anhydrides, polyamines, epihalohydrins, diepoxides, dialdehydes, diols, carboxylic acid halides, and ketenes, combinations thereof, and the like. Preferably, the organic crosslinking agent that crosslinks PVA is soluble or dispersible in water or water/alcohol mixtures. Preferred organic crosslinking agents are melamine formaldehyde resins, glycoluril formaldehyde resins, and epihalohydrins. Melamine formaldehyde and glyocuril formaldehyde resins are prepared by reacting melamine and glycouril, respectively; with formaldehyde (methylolation reaction, also referred to as formylation) and then with alcohols (etherification reaction, also referred to as alkylation). A wide range of melamine formaldehyde resins and glycoluril formaldehyde resins which are prepared using different degrees of formylation and alkylation and different alcohols during the etherification reaction are useful for the purpose of the present invention. These resins may be monomeric or polymeric in nature due to the extent of self condensation reaction that may occur during their preparation. A variety of suitable melamine formaldehyde and glyocuril formaldehyde resins are available commercially from Cytec Industries Inc. (CYMEL® resins). Preferred epihalohydrins for the purpose of the present invention are polyamide-epichlorohydrin crosslinking agents available commercially from Hercules Inc. (POLYCUP® resins).

In one particularly preferred embodiment, the organic crosslinking agent is a melamine formaldehyde resin and the inorganic crosslinking agent comprises a boron compound. Preferably, the glue composition also includes a second inorganic crosslinking agent, especially zinc chloride.

In one embodiment, the glue solution is an aqueous solution comprising a water miscible organic solvent having a concentration of 0.5 to 60 weight percent, an inorganic crosslinking agent having a concentration of from 0.05 to 5 weight percent, and substantially no hydrophilic polymer. Preferably, the glue solution is free of hydrophilic polymer or at least essentially free, for example, if hydrophilic polymer is present, it is present in an amount of less than 1 weight percent, more preferably less than 0.05 weight percent, based on the wet solution applied. Optionally zinc chloride, for water resistance, or other additives can be included.

The cover sheet used in the invention can optionally comprise one or more auxiliary layers. Suitable auxiliary layers for use in the present invention include abrasion resistant hardcoat layer, antiglare layer, anti-smudge layer or stain-resistant layer, antireflection layer, low reflection layer, antistatic layer, viewing angle compensation layer, and moisture barrier layer.

In a further embodiment, for use in the present method, a guarded cover sheet composite can be used that comprises a carrier substrate, a cover sheet comprising a low birefringence protective polymer film, a layer promoting adhesion to poly(vinyl alcohol) film, and an optional tie layer between said low birefringence protective polymer film and said layer promoting adhesion to poly(vinyl alcohol) film, and one or more auxiliary layers on the same side of said carrier substrate as the low birefringence protective polymer film. Optionally, the guarded cover sheet composite also comprises a strippable, protection layer on the side of the cover sheet opposite to the carrier substrate. The guarded cover sheet composite is particularly effective when the low birefringence protective polymer film is thin, for example, when the thickness is about 40 micrometers or less.

Turning now to FIG. 1 there is shown a schematic of an exemplary and well-known coating and drying system 10 suitable for preparing the cover sheets that can be used in the method of the present invention. The coating and drying system 10 may be used to apply very thin films to a moving carrier substrate 12 and to subsequently remove solvent in a dryer 14. A single coating apparatus 16 is shown such that system 10 has only one coating application point and only one dryer 14, but two or three (even as many as six) additional coating application points with corresponding drying sections are known in the fabrication of composite thin films. The process of sequential application and drying is known in the art as a tandem coating operation.

Coating and drying system 10 includes an unwinding station 18 to feed the moving substrate 12 around a back-up roller 20 where the coating is applied by coating apparatus 16. The coated substrate 22 then proceeds through the dryer 14. In one embodiment of the present invention, a guarded cover sheet composite 24 comprising a cover sheet on substrate 12 is wound into rolls at a wind-up station 26.

As depicted, an exemplary four-layer coating is applied to moving web 12. Coating liquid for each layer is held in respective coating supply vessel 28, 30, 32, 34. The coating liquid is delivered by pumps 36, 38, 40, 42 from the coating supply vessels to the coating apparatus 16 via conduits 44, 46, 48, 50, respectively. In addition, coating and drying system 10 may also include electrical discharge devices, such as corona or glow discharge device 52, or polar charge assist device 54, to modify the substrate 12 prior to application of the coating.

Figure 2:
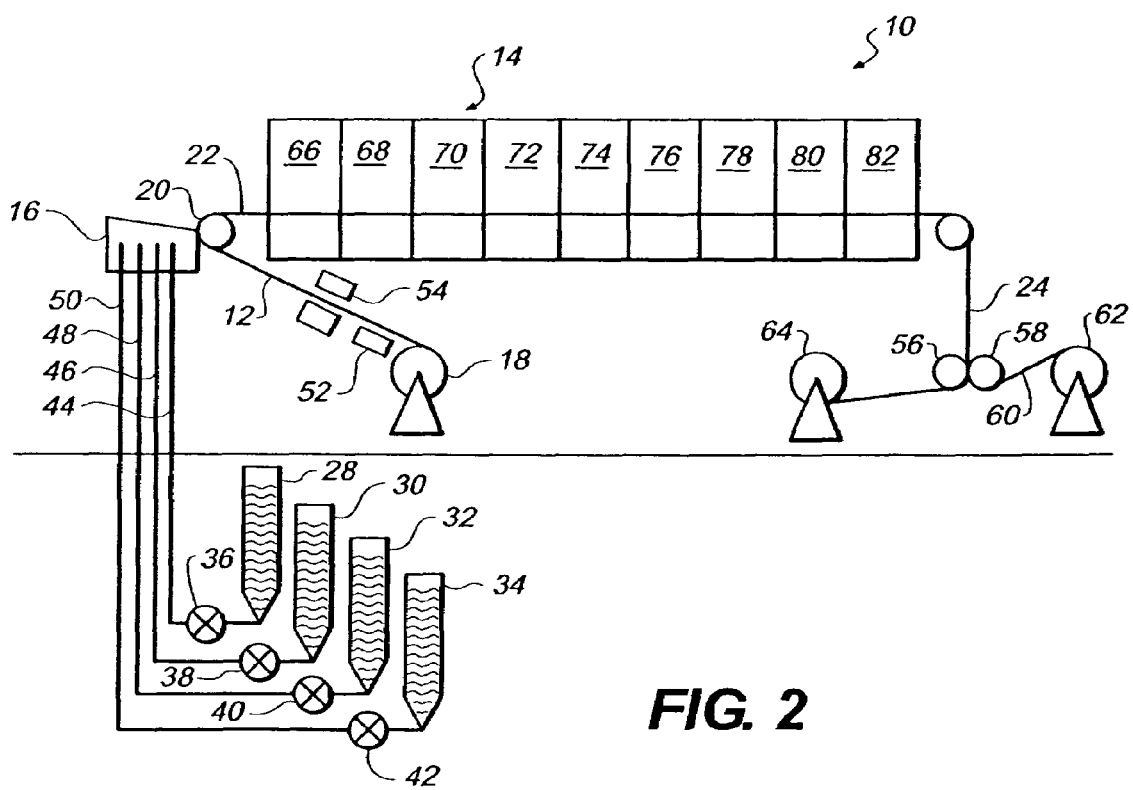
FIG. 2 is a schematic of an exemplary coating and drying apparatus as in FIG. 1 but also including a station where an alternate winding operation further comprises application of a strippable protection layer.

Turning next to FIG. 2 there is shown a schematic of the same exemplary coating and drying system 10 depicted in FIG. 1 with an alternative winding operation to apply a strippable protection layer. Accordingly, the figures are numbered identically up to the winding operation. In the practice of the present invention the guarded cover sheet composite 24 comprising a carrier substrate (which may be a resin film, paper, resin-coated paper, or metal) with a cover sheet applied thereto is taken between opposing nip rollers 56, 58. The guarded cover sheet composite 24 is adhesively adhered or electrostatically adhered to a preformed strippable protection layer 60 which is supplied from unwinding station 62 and the guarded cover sheet composite 24 containing the strippable protection layer 60 is wound into rolls at wind-up station 64. In a preferred embodiment of the present invention, polyolefin or polyethylene phthalate (PET) is used as the preformed, strippable protection layer 60. Either the cover sheet/carrier substrate composite 24 or the protection layer 60 may be pretreated with an electric charge generator to enhance the electrostatic attraction of the protection layer 60 to the cover sheet/carrier substrate composite 24.

The coating apparatus 16 used to deliver coating fluids to the moving substrate 12 may be a multi-layer applicator such as a slide bead hopper, as taught for example in U.S. Pat. No. 2,761,791 to Russell, or a slide curtain hopper, as taught by U.S. Pat. No. 3,508,947 to Hughes. Alternatively, the coating apparatus 16 may be a single layer applicator, such as slot die bead hopper or jet hopper. In a preferred embodiment of the present invention, the application device 16 is a multi-layer slide bead hopper.

As mentioned above, coating and drying system 10 includes a dryer 14 that will typically be a drying oven to remove solvent from the coated film. An exemplary dryer 14 used in the practice of the method of the present invention includes a first drying section 66 followed by eight additional drying sections 68-82 capable of independent control of temperature and air flow. Although dryer 14 is shown as having nine independent drying sections, drying ovens with fewer compartments are well known and may be used to practice the method of the present invention. In a preferred embodiment of the present invention the dryer 14 has at least two independent drying zones or sections.

Preferably, each of drying sections 66-82 has independent temperature and airflow controls. In each section, temperature may be adjusted between 5° C. and 150° C. To minimize drying defects from case hardening or skinning-over of the wet layers, optimum drying rates are needed in the early sections of dryer 14. There are a number of artifacts created when temperatures in the early drying zones are inappropriate. For example, fogging or blush of cellulose acetate films is observed when the temperature in zones 66, 68 and 70 are set at 25° C. This blush defect is particularly problematic when high vapor pressure solvents (methylene chloride and acetone) are used in the coating fluids. Aggressively high temperatures of 95° C. in the early drying sections 66, 68, and 70 tend to cause premature delamination of the cover sheet from the carrier substrate. Higher temperatures in the early drying sections are also associated with other artifacts such as case hardening, reticulation patterns, and blistering of the cover sheet.

In a preferred embodiment, the first drying section 66 is operated at a temperature of at least about 25° C. but less than 95° C. with no direct air impingement on the wet coating of the coated substrate 22. In another preferred embodiment of the method of the present invention, drying sections 68 and 70 are also operated at a temperature of at least about 25° C. but less than 95° C. It is preferred that initial drying sections 66, 68 be operated at temperatures between about 30° C. and about 60° C. It is most preferred that initial drying sections 66, 68 be operated at temperatures between about 30° C. and about 50° C. The actual drying temperature in drying sections 66, 68 may optimize empirically within these ranges by those skilled in the art.

Figure 3:
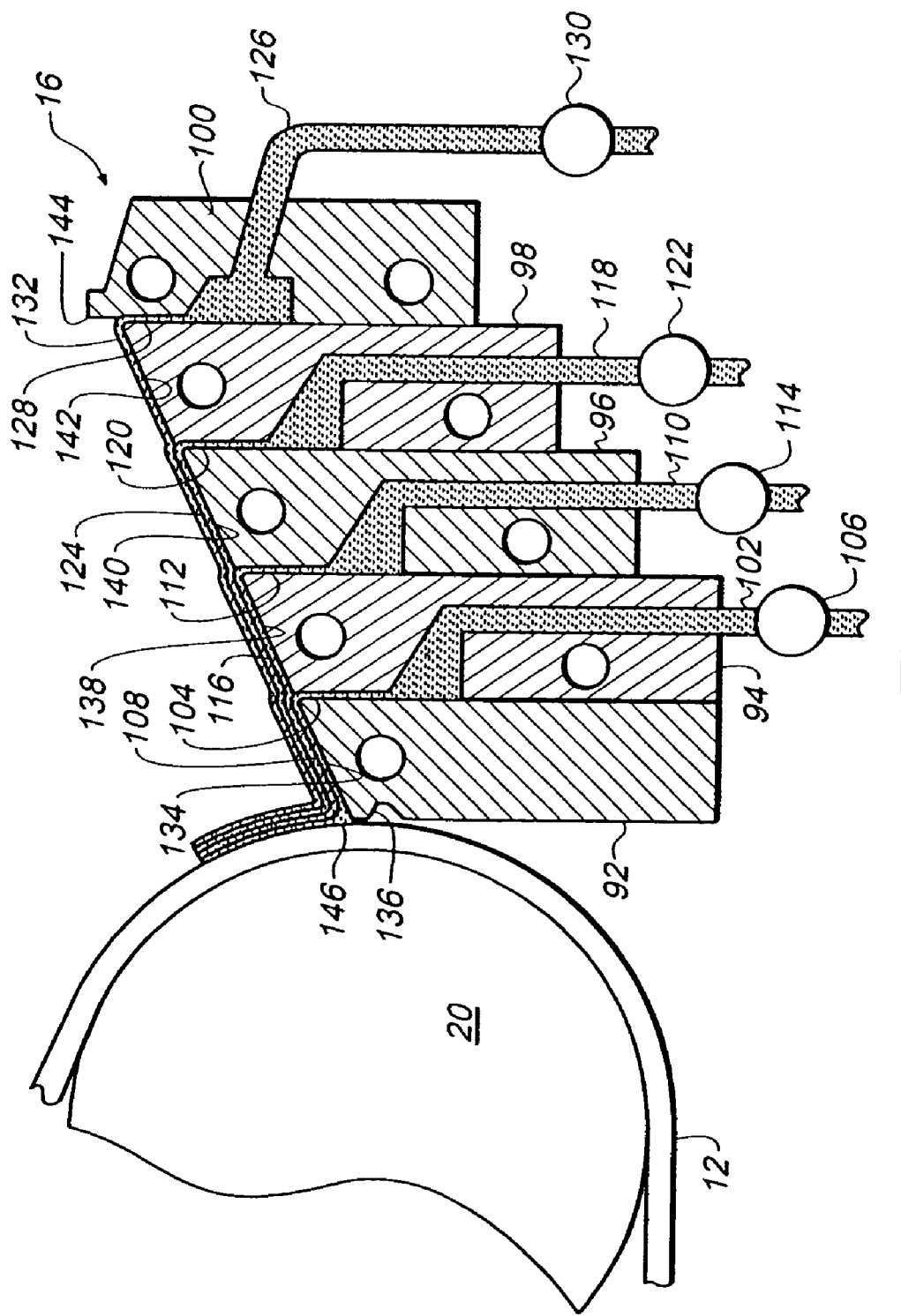
FIG. 3 is a schematic of an exemplary multi-slot coating apparatus that can be used in the practice of the present invention.

Referring now to FIG. 3, a schematic of an exemplary coating apparatus 16 is shown in detail. Coating apparatus 16, schematically shown in side elevational cross-section, includes a front section 92, a second section 94, a third section 96, a fourth section 98, and a back plate 100. There is an inlet 102 into second section 94 for supplying coating liquid to first metering slot 104 via pump 106 to thereby form a lowermost layer 108. There is an inlet 110 into third section 96 for supplying coating liquid to second metering slot 112 via pump 114 to form layer 116. There is an inlet 118 into fourth section 98 for supplying coating liquid to metering slot 120 via pump 122 to form layer 124. There is an inlet 126 into back plate 100 for supplying coating liquid to metering slot 128 via pump 130 to form layer 132. Each slot 104, 112, 120, 128 includes a transverse distribution cavity. Front section 92 includes an inclined slide surface 134, and a coating lip 136. There is a second inclined slide surface 138 at the top of second section 94. There is a third inclined slide surface 140 at the top of third section 96. There is a fourth inclined slide surface 142 at the top of fourth section 98. Back plate 100 extends above inclined slide surface 142 to form a back land surface 144. Residing adjacent the coating apparatus or hopper 16 is a coating back-up roller 20 about which a web 12 is conveyed. Coating layers 108, 116, 124, 132 form a multilayer composite sheet which forms a coating bead 146 between lip 136 and substrate 12. Typically, the coating hopper 16 is movable from a non-coating position toward the coating back-up-roller 20 and into a coating position. Although coating apparatus 16 is shown as having four metering slots, coating dies having a larger number of metering slots (as many as nine or more) are well known and may be used to practice the method of the present invention.

The coating fluids for the low birefringence protective polymer film are comprised principally of a polymer binder dissolved in an organic solvent. In a particularly preferred embodiment, the low birefringence protective polymer film is a cellulose ester. These are commercially available in a variety of molecular weight sizes as well as in the type and degree of alkyl substitution of the hydroxyl groups on the cellulose backbone. Examples of cellulose esters include those having acetyl, propionyl, and butyryl groups. Of particular interest is the family of cellulose esters with acetyl substitution known as cellulose acetate. Of these, the fully acetyl substituted cellulose having a combined acetic acid content of approximately 58.0-62.5% is known as triacetyl cellulose (TAC) and is generally preferred for preparing cover sheets used in electronic displays.

In terms of organic solvents for TAC, suitable solvents, for example, include chlorinated solvents (methylene chloride and 1,2 dichloroethane), alcohols (methanol, ethanol, n-propanol, isopropanol, n-butanol, isobutanol, diacetone alcohol and cyclohexanol), ketones (acetone, methylethyl ketone, methylisobutyl ketone, and cyclohexanone), esters (methyl acetate, ethyl acetate, n-propyl acetate, isopropyl acetate, isobutyl acetate, n-butyl acetate, and methylacetoacetate), aromatics (toluene and xylenes) and ethers (1,3-dioxolane, 1,2-dioxolane, 1,3-dioxane, 1,4-dioxane, and 1,5-dioxane). In some applications, small amounts of water may be used. Normally, TAC solutions are prepared with a blend of one or more of the aforementioned solvents. Preferred primary solvents include methylene chloride, acetone, methyl acetate, and 1,3-dioxolane. Preferred co-solvents for use with the primary solvents include methanol, ethanol, n-butanol, and water.

Coating formulations may also contain plasticizers. Appropriate plasticizers for TAC films include phthalate esters (dimethylphthalate, dimethoxyethyl phthalate, diethylphthalate, dibutylphthalate, dioctylphthalate, didecylphthalate and butyl octylphthalate), adipate esters (dioctyl adipate), phosphate esters (tricresyl phosphate, biphenylyl diphenyl phosphate, cresyl diphenyl phosphate, octyl diphenyl phosphate, tributyl phosphate, and triphenyl phosphate), and glycolic acid esters (triacetin, tributyrin, butyl phthalyl butyl glycolate, ethyl phthalyl ethyl glycolate, and methyl phthalyl ethyl glycolate. Non-aromatic ester plasticizers as described in commonly assigned co-pending U.S. patent application Ser. No. 10/945,305, filed Sep. 20, 2004. Plasticizers are normally used to improve the physical and mechanical properties of the final film. In particular, plasticizers are known to improve the flexibility and dimensional stability of cellulose acetate films. However, plasticizers are also used here as coating aids in the converting operation to minimize premature film solidification at the coating hopper and to improve drying characteristics of the wet film. In the method of the present invention, plasticizers are used to minimize blistering, curl and delamination of TAC films during the drying operation. In a preferred embodiment of the present invention, plasticizers are added to the coating fluid at a total concentration of up to 50% by weight relative to the concentration of polymer in order to mitigate defects in the final TAC film.

The coating formulation for the low birefringence protective polymer may also contain one or more UV absorbing compounds to provide UV filter element performance and/or act as UV stabilizers for the low birefringence protective polymer film. Ultraviolet absorbing compounds are generally contained in the polymer in an amount of 0.01 to 20 weight parts based on 100 weight parts of the polymer containing no ultraviolet absorber, and preferably contained in an amount of 0.01 to 10 weight parts, especially in an amount of 0.05 to 2 weight parts. Any of the various ultraviolet light absorbing compounds which have been described for use in various polymeric elements may be employed in the polymeric elements of the invention, such as hydroxyphenyl-s-triazine, hydroxyphenylbenzotriazole, formamidine, or benzophenone compounds. As described in copending, commonly assigned U.S. patent application Ser. No. 10/150,634, filed May 5, 2002, hereby incorporated by reference, the use of dibenzoylmethane ultraviolet absorbing compounds in combination with a second UV absorbing compound such as those listed above have been found to be particularly advantageous with respect to providing both a sharp cut off in absorption between the UV and visible light spectral regions as well as increased protection across more of the UV spectrum. Additional possible UV absorbers which may be employed include salicylate compounds such as 4-t-butylphenylsalicylate; and [2,2'-thiobis-(4-t-octylphenolate)]n-butylamine nickel(II). Most preferred are combinations of dibenzoylmethane compounds with hydroxyphenyl-s-triazine or hydroxyphenylbenzotriazole compounds.

Dibenzoylmethane ultraviolet absorbing compounds which may be employed include those of the formula (I):

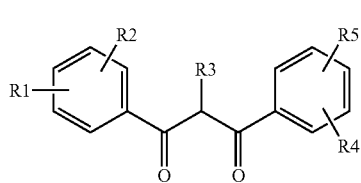

where R1 through R5 are each independently hydrogen, halogen, nitro, or hydroyxl, or further substituted or unsubstituted alkyl, alkenyl, aryl, alkoxy, acyloxy, ester, carboxyl, alkyl thio, aryl thio, alkyl amine, aryl amine, alkyl nitrile, aryl nitrile, arylsulfonyl, or 5-6 member heterocylce ring groups. Preferably, each of such groups comprises 20 or fewer carbon atoms. Further preferably, R1 through R5 of Formula IV are positioned in accordance with Formula IA:

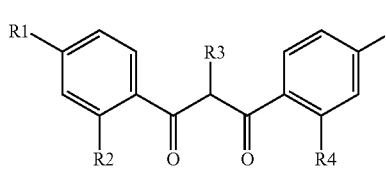

Particularly preferred are compounds of Formula I-A where R1 and R5 represent alkyl or alkoxy groups of from 1-6 carbon atoms and R2 through R4 represent hydrogen atoms.

Representative compounds of Formula (I) which may be employed in accordance with the elements of the invention include the following:

(IV-1): 4-(1,1-dimethylethyl)-4'-methoxydibenzoylmethane (PARSOL® 1789)

(IV-2): 4-isopropyl dibenzoylmethane (EUSOLEX® 8020)

(IV-3): dibenzoylmethane (RHODIASTAB® 83)

Hydroxyphenyl-s-triazine ultraviolet absorbing compounds which may be used in the elements of the invention, e.g., may be a derivative of tris-aryl-s-triazine compounds as described in U.S. Pat. No. 4,619,956. Such compounds may be represented by Formula II:

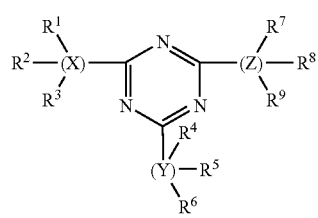

wherein X, Y and Z are each aromatic, carbocylic radicals of less than three 6-membered rings, and at least one of X, Y and Z is substituted by a hydroxy group ortho to the point of attachment to the triazine ring; and each of R1 through R9 is selected from the group consisting of hydrogen, hydroxy, alkyl, alkoxy, sulfonic, carboxy, halo, haloalkyl, and acylamino. Particularly preferred are hydroxyphenyl-s-triazines of the formula IIA:

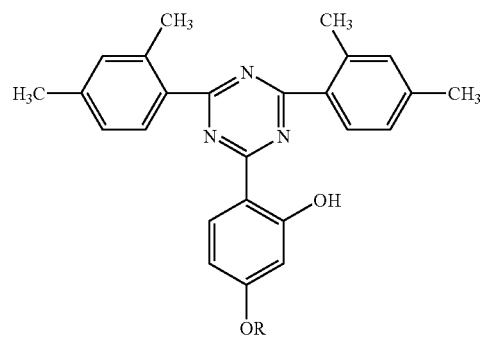

wherein R is hydrogen or alkyl of 1-18 carbon atoms.

Hydroxyphenylbenzotriazole compounds which may be used in the elements of the invention, e.g., may be a derivative of compounds represented by Formula III:

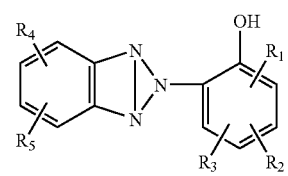

wherein R1 through R5 may be independently hydrogen, halogen, nitro, hydroxy, or further substituted or unsubstituted alkyl, alkenyl, aryl, alkoxy, acyloxy, aryloxy, alkylthio, mono or dialkyl amino, acyl amino, or heterocyclic groups. Specific examples of benzotriazole compounds which may be used in accordance with the invention include 2-(2'-hydroxy-3'-t-butyl-5'-methylphenyl)-5-chlorobenzotriazole; 2-(2'-hydroxy-3',5'-di-t-amylphenyl)benzotriazole; octyl 5-tert-butyl-3-(5-chloro-2H-benzotriazole-2-yl)-4-hydroxybenzenepropionate; 2-(hydroxy-5-t-octylphenyl) benzotriazole; 2-(2'-hydroxy-5'-methylphenyl) benzotriazole; 2-(2'-hydroxy-3'-dodecyl-5'-methylphenyl) benzotriazole; and 2-(2'-hydroxy-3',5'-di-t-butylphenyl)-5-chlorobenzotriazole.

Formamidine ultraviolet absorbing compounds which may be used in the elements of the invention, e.g., may be a formamidine compound as described in U.S. Pat. No. 4,839,405. Such compounds may be represented by Formula IV or Formula V:

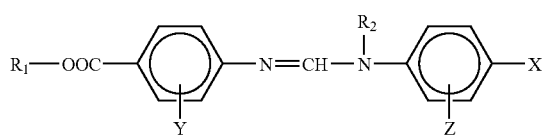

wherein R1 is an alkyl group containing 1 to about 5 carbon atoms; Y is a H, OH, Cl or an alkoxy group; R2 is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen;

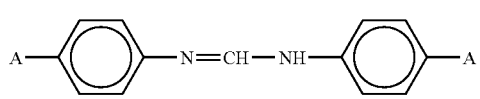

(V)

wherein A is —COOR, —COOH, —CONR'R", —NR'COR, —CN, or a phenyl group; and wherein R is an alkyl group of from 1 to about 8 carbon atoms; R' and R" are each independently hydrogen or lower alkyl groups of from 1 to about 4 carbon atoms. Specific examples of formamidine compounds which may be used in accordance with the invention include those described in U.S. Pat. No. 4,839,405, and specifically 4-[[(methylphenylamino)methylene]amino]-ethyl ester.

Benzophenone compounds which may be used in the elements of the invention, e.g., may include 2,2'-dihydroxy-4, 4'dimethoxybenzophenone, 2-hydroxy-4-methoxybenzophenone and 2-hydroxy-4-n-dodecyloxybenzophenone.

Coating formulations may also contain surfactants as coating aids to control artifacts related to flow after coating. Artifacts created by flow after coating phenomena include mottle, repellencies, orange-peel (Bernard cells), and edge-withdraw. Surfactants used control flow after coating artifacts include siloxane and fluorochemical compounds. Examples of commercially available surfactants of the siloxane type include: (1) Polydimethylsiloxanes such as DC200® Fluid from Dow Corning, (2) Poly(dimethyl, methylphenyl)siloxanes such as DC510® Fluid from Dow Corning, and (3) Polyalkyl substituted polydimethysiloxanes such as DC190® and DC1248® from Dow Corning as well as the L7000 Silwet® series (L7000, L7001, L7004 and L7230) from Union Carbide, and (4) Polyalkyl substituted poly(dimethyl, methylphenyl)siloxanes such as SF1023 from General Electric. Examples of commercially available fluorochemical surfactants include: (1) Fluorinated alkyl esters such as the Fluorad® series (FC430 and FC431) from the 3M Corporation; (2) Fluorinated polyoxyethylene ethers such as the Zonyl series (FSN, FSN100, FSO, FSO100) from DuPont; (3) Acrylate:polyperfluoroalkyl ethylacrylates such as the F series (F270 and F600) from NOF Corporation; and (4) Perfluoroalkyl derivatives such as the Surflon® series (S383, S393, and S8405) from the Asahi Glass Company. In the method of the present invention, surfactants are generally of the non-ionic type. In a preferred embodiment of the present invention, non-ionic compounds of either the siloxane or fluorinated type are added to the uppermost layers.

In terms of surfactant distribution, surfactants are most effective when present in the uppermost layers of the multilayer coating. In the uppermost layer, the concentration of surfactant is preferably 0.001-1.000% by weight and most preferably 0.010-0.500%. In addition, lesser amounts of surfactant may be used in the second uppermost layer to minimize diffusion of surfactant into the lowermost layers. The concentration of surfactant in the second uppermost layer is preferably 0.000-0.200% by weight and most preferably between 0.000-0.100% by weight. Because surfactants are only necessary in the uppermost layers, the overall amount of surfactant remaining in the final dried film is small.

Although surfactants are not required to practice the method of the current invention, surfactants do improve the uniformity of the coated film. In particular, mottle non-uniformities are reduced by the use of surfactants. In transparent cellulose acetate films, mottle non-uniformities are not readily visualized during casual inspection. To visualize mottle artifacts, organic dyes may be added to the uppermost layer to add color to the coated film. For these dyed films, non-uniformities are easy to see and quantify. In this way, effective surfactant types and levels may be selected for optimum film uniformity.

Figure 4:
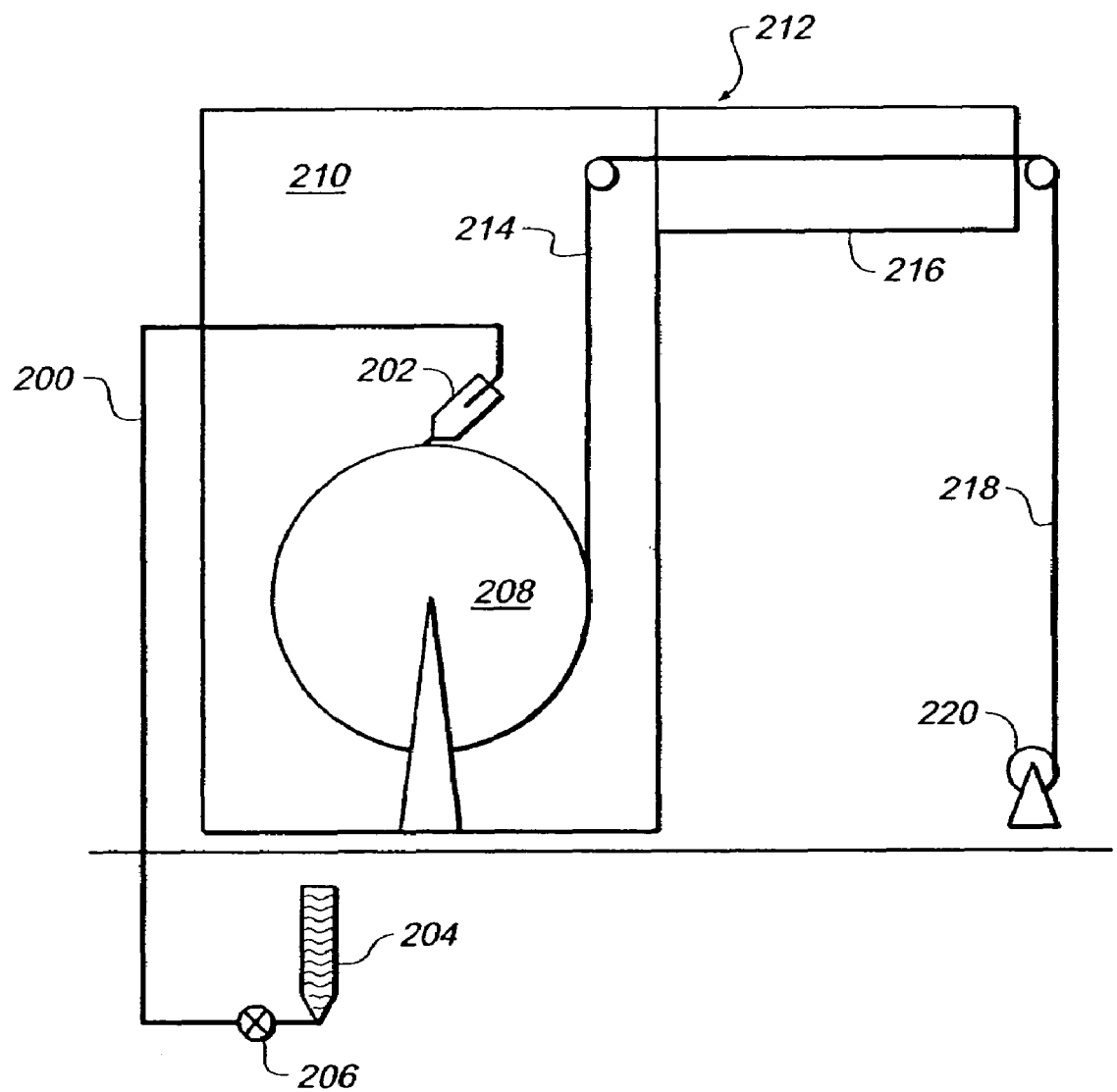
FIG. 4 is a schematic of an exemplary casting apparatus that can be used in the practice of the present invention.

As an alternative to the exemplary coating method and apparatus of FIG. 3 for making the low birefringence protective polymer film, a casting method and apparatus can be used. Turning now to FIG. 4 there is shown a schematic of an exemplary casting and drying system suitable for preparing cover sheets used the present invention. A viscous dope comprising a low birefringence protective polymer is delivered through a feed line 200 to an extrusion hopper 202 from a pressurized tank 204 by a pump 206. The dope is cast onto a highly polished metal drum 208 located within a first drying section 210 of the drying oven 212. The cast polymer film 214 is allowed to partially dry on the moving metal drum 208 and is then peeled from the drum 208. The cast polymer film 214 is then conveyed to a final drying section 216 to remove the remaining solvent. The final dried low birefringence protective polymer film 218 is then wound into rolls at a wind-up station 220. The cast polymer film typically has a thickness in the range of from 40 to 200 µm.

Coating methods such as illustrated in FIG. 3 are distinguished from casting methods such as illustrated in FIG. 4 by the process steps necessary for each technology. These process steps in turn affect a number of tangibles such as fluid viscosity, converting aids, substrates, and hardware that are unique to each method. In general, coating methods involve application of dilute low viscosity liquids to thin flexible substrates, evaporating the solvent in a drying oven, and winding the dried film/substrate composite into rolls. In contrast, casting methods involve applying a concentrated viscous dope to a highly polished metal drum or band, partially drying the wet film on the metal substrate, stripping the partially dried film from the substrate, removing additional solvent from the partially dried film in a drying oven, and winding the dried film into rolls. In terms of viscosity, coating methods require very low viscosity liquids of less than 5,000 cp. In the present invention the viscosity of the coated liquids will generally be less than 2000 cp and most often less than 1500 cp. Moreover, in the coating method the viscosity of the lowermost layer is preferred to be less than 200 cp. and most preferably less than 100 cp. for high speed coating application. In contrast, casting methods require highly concentrated dopes with viscosity on the order of 10,000-100,000 cp for practical operating speeds. In terms of converting aids, coating methods generally involve the use of surfactants as converting aids to control flow after coating artifacts such as mottle, repellencies, orange peel, and edge withdraw. In contrast, casting methods do not require surfactants. Instead, converting aids are only used to assist in the stripping operation in casting methods. For example, n-butanol is sometimes used as a converting aid in casting TAC films to facilitate stripping of the TAC film from the metal drum. In terms of substrates, coating methods generally utilize thin (10-250 µm) flexible supports. In contrast, casting methods employ thick (1-100 mm), continuous, highly polished metal drums or rigid bands. As a result of these differences in process steps, the hardware used in coating is conspicuously different from those used in casting as can be seen by a comparison of the schematics shown in FIGS. 1 and 4, respectively.

The preparation of a cover sheet or the guarded cover sheet composite that can be used in the present method may also include the step of coating over a previously prepared (by coating or casting process) film. For example, the coating and drying system 10 shown in FIGS. 1 and 2 may be used to apply a second film or multi-layer film to an existing low birefringence protective polymer film or cover sheet composite. If the film or cover sheet composite is wound into rolls before applying the subsequent coating, the process is called a multi-pass coating operation. If coating and drying operations are carried out sequentially on a machine with multiple coating stations and drying ovens, then the process is called a tandem coating operation. In this way, thick low birefringence protective polymer films may be prepared at high line speeds without the problems associated with the removal of large amounts of solvent from a very thick wet film. Alternatively, many different cover sheet configurations having various combinations of auxiliary layers applied via a tandem or multi-pass coating operation may be prepared. Moreover, the practice of multi-pass or tandem coating also has the advantage of minimizing other artifacts such as streak severity, mottle severity, and overall film non-uniformity.

Figure 5:
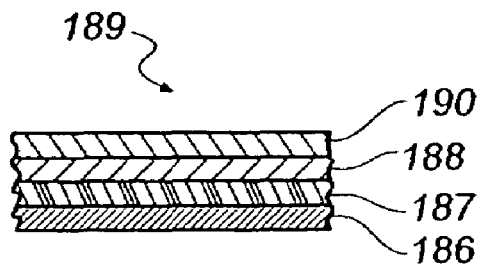
FIG. 5 shows a cross-sectional representation of a three-layer cover sheet of the invention.

Turning next to FIGS. 5 through 8, there are presented cross-sectional illustrations showing various cover sheet and guarded cover sheet composite configurations possible for use with the present invention. FIG. 5 shows a cover sheet 189 having lowermost layer 186, intermediate layers 187 and 188, and uppermost layer 190. In this illustration, layer 186 could be a layer promoting adhesion to PVA, 187 could be a tie layer, layer 188 could be a low birefringence protective polymer film, and layer 190 could be an auxiliary layer such as a viewing angle compensation layer, moisture barrier layer, abrasion resistant layer, or other type of auxiliary layer, for example. The cover sheet may be prepared by conventional casting methods or by coating methods employing a carrier substrate as described hereinabove.

Figure 6:
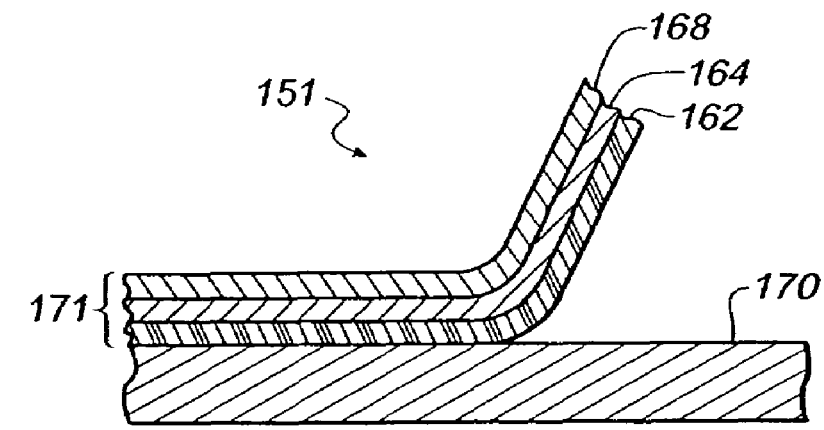
FIG. 6 shows a cross-sectional representation of a guarded cover sheet of the invention comprising a three-layer cover sheet and a partially peeled carrier substrate.

In FIG. 6, a guarded cover sheet composite 151 comprising a three-layer cover sheet 171 having lowermost layer 162, intermediate layer 164, and uppermost layer 168 is shown partially peeled from a carrier substrate 170. In this illustration, layer 162 could be a layer promoting adhesion to PVA, layer 164 could be a tie layer, and layer 168 could be a low birefringence protective polymer film. Layers 162, 164, and 168 may be formed either by applying and drying three separate liquid layers on the carrier substrate 170 or by simultaneously applying two or all three of the layers and then drying those simultaneously applied layers in a single drying operation.

In a preferred embodiment, the layer promoting adhesion to PVA is coated and dried separately from the tie layer and low birefringence protective polymer film using a water-based coating formulation. When a cover sheet 171 is prepared by coating onto a carrier substrate 170 as illustrated in FIG. 6, it is generally preferred that the layer promoting adhesion to PVA is coated onto the carrier substrate 170 and then dried, prior to application of the low birefringence protective polymer film. Auxiliary layers may be applied either simultaneously with the low birefringence protective polymer film or in a subsequent coating and drying operation.

Figure 7:
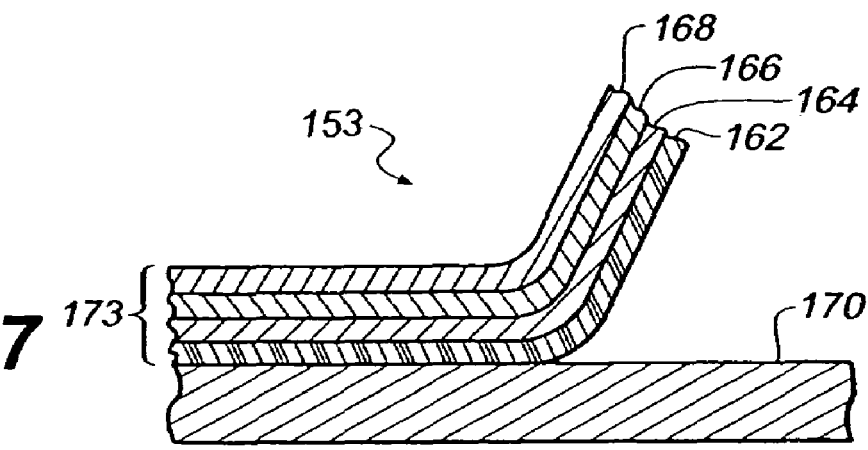
FIG. 7 shows a cross-sectional representation of a guarded cover sheet of the invention comprising a four-layer cover sheet and a partially peeled carrier substrate.

FIG. 7 illustrates another guarded cover sheet composite 153 comprising a cover sheet 173 that is comprised of, for example, four compositionally discrete layers including a lowermost layer 162 nearest to the carrier support 170, two intermediate layers 164 and 166, and an uppermost layer 168. FIG. 7 also shows that the entire multiple layer cover sheet 173 may be peeled from the carrier substrate 170. In this illustration, layer 162 could be a layer promoting adhesion to PVA, layer 164 could be a tie layer, layer 166 could be a low birefringence protective polymer film, and layer 168 could be an auxiliary layer such as an abrasion resistant layer, for example.

Figure 8:
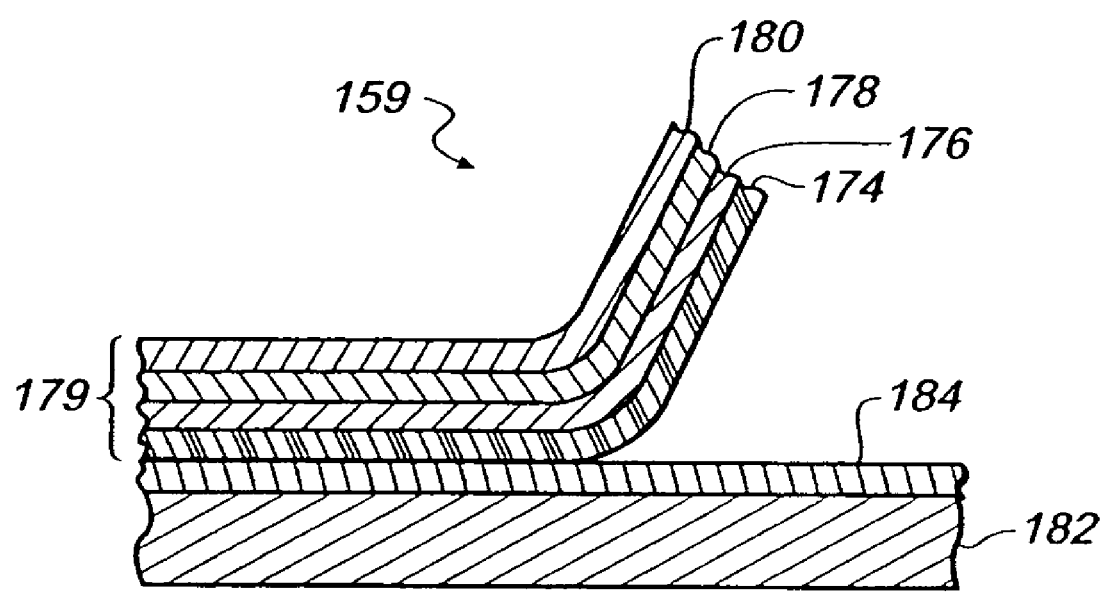
FIG. 8 shows a cross-sectional representation of a guarded cover sheet of the invention comprising a four-layer cover sheet and a partially peeled carrier substrate wherein the carrier substrate has a release layer formed thereon.

FIG. 8 illustrates a further guarded cover sheet composite 159 comprising a cover sheet 179 that is comprised of, for example, four compositionally discrete layers including a lowermost layer 174 nearest to the carrier substrate 182, two intermediate layers 176 and 178, and an uppermost layer 180. The carrier substrate 182 has been treated with a release layer 184 to modify the adhesion between the cover sheet lowermost layer 174 and substrate 182. Release layer 184 may be comprised of a number of polymeric materials such as polyvinylbutyrals, cellulosics, polyacrylates, polycarbonates and poly(acrylonitrile-co-vinylidene chloride-co-acrylic acid). The choice of materials used in the release layer may be optimized empirically by those skilled in the art.

FIGS. 5 through 8 serve to illustrate some of the guarded cover sheet composites that may be constructed based on the detailed teachings provided hereinabove, they are not intended to be exhaustive of all possible variations of the invention. One skilled in the art could conceive of many other layer combinations that would be useful as guarded cover sheet composites for use in the preparation of polarizer plates for displays.

Figure 9:
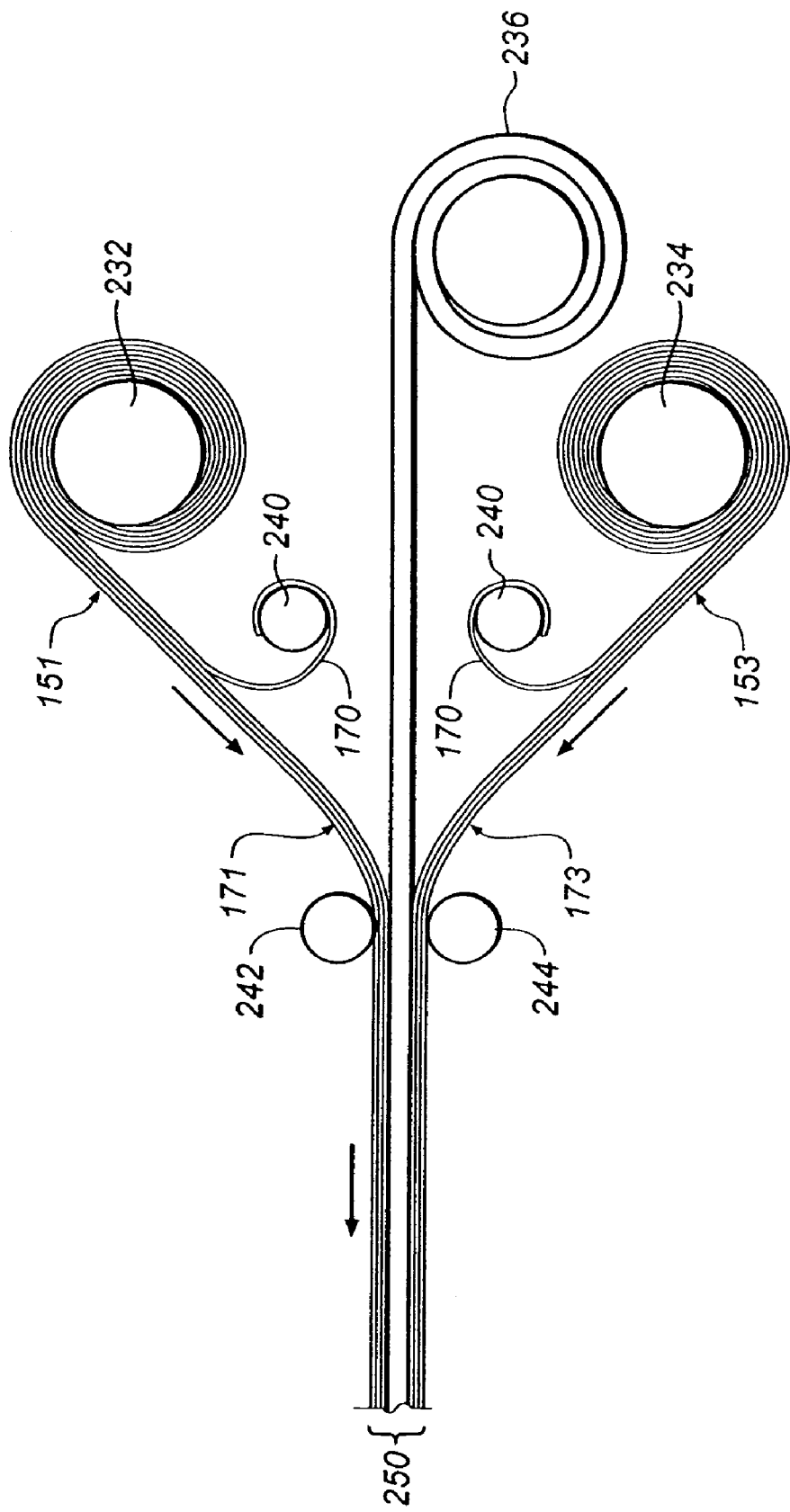
FIG. 9 shows a schematic of a method to fabricate a polarizer plate using the guarded cover sheet composites of the invention.

Turning now to FIG. 9, a schematic representation of a method to fabricate a polarizer plate from guarded cover sheet composites in accordance with one embodiment of the invention is illustrated. Guarded cover sheet composite 151 (see FIG. 6) comprising cover sheet 171 and carrier substrate 170 and guarded cover sheet composite 153 (see FIG. 7) comprising cover sheet 173 and carrier substrate 170 are supplied from supply rolls 232 and 234, respectively. A PVA dichroic film is supplied from supply roll 236. Prior to entering a lamination nip between opposing pinch rollers 242 and 244, the carrier substrate 170 is peeled from guarded cover sheet composites 151 and 153 to expose a lowermost layer (in the case of FIGS. 6 and 7, this is layer 162, which for the purpose of example is the layer promoting adhesion to PVA). The peeled carrier sheet 170 is wound into rolls at take-up rolls 240. The glue solution may be optionally applied to both sides of the PVA dichroic film or to the lowermost layer of cover sheets 171 and 173 prior to the sheets and film entering the nip between pinch rollers 232 and 234. Preferably, the glue solution is applied to the lowermost layer of cover sheets 171 and 173 in order to swell the layer promoting adhesion to PVA on each cover sheet. The amount of the solution applied onto the films can vary widely depending on its composition. For example, a wet film coverage as low as 1 cc/m$^2$ and as high as 100 cc/m$^2$ are possible. Low wet film coverages are desirable to reduce the drying time needed.

Cover sheets 171 and 173 are then laminated to either side of PVA dichroic film with the application of pressure (and, optionally, heat) between the opposing pinch rollers 242 and 244, resulting in the polarizer plate 250 in sheet form. Polarizer plate 250 may then be dried by heating and wound into rolls until needed. Depending on the particular layer configuration for the guarded cover sheet composites employed, a wide variety of polarizer plates having cover sheets with various combinations of auxiliary layers may be fabricated.

Optionally, it is possible to apply the guarded cover sheet to the polarizing film without removing the carrier substrate (on one or both sides). For example, the layer promoting adhesion can be located on the opposite side of the protective layer from the carrier substrate. This embodiment has the advantage of providing additional protection for the polarizing plate during transport.

For cover sheets wherein a low birefringence protective polymer film is prepared by a conventional casting process (wherein a polymer dope is case onto a continuous metal wheel or drum and then peeled prior to completion of the drying process) and the tie layer and layer promoting adhesion to PVA are applied in a subsequent coating operation, the method of fabricating polarizing plates is simplified compared to that represented in FIG. 9. In this case, since a carrier substrate is not employed, the step of peeling and winding the carrier substrate as shown in FIG. 9 is not necessary. Instead, the cover sheet, which is preferably supplied in roll form, merely needs to be unwound and supplied to the lamination nip formed between a pair of pinch rollers that are analogous to rollers 242 and 244 shown FIG. 9. As before, a glue solution may be optionally applied to both sides of the PVA dichroic film or to the layers promoting adhesion to PVA prior to the cover sheets and film entering the nip between the pinch rollers.

In accordance with the practice of the present invention, the cover sheet is laminated to the PVA dichroic film such that the layer promoting adhesion to PVA is on the side of the cover sheet that contacts the PVA dichroic film.

Low birefringence protective polymer films suitable for use in the present invention comprise polymeric materials having low Intrinsic Birefringence $\Delta n_{int}$ that form high clarity films with high light transmission (i.e., >85%). Preferably, the low birefringence protective polymer film has in-plane birefringence, $\Delta n_{in}$ of less than about $1 \times 10^{-4}$ and an out-of-plane birefringence, $\Delta n_{th}$ of from 0.005 to −0.005.

Exemplary polymeric materials for use in the low birefringence protective polymer films include cellulose esters (including triacetyl cellulose (TAC), cellulose diacetate, cellulose acetate butyrate, cellulose acetate propionate), polycarbonates (such as Lexan® available from General Electric Corp., bisphenol-A-trimethylcyclohexane-polycarbonate, bisphenol-A-phthalate-polycarbonate), polysulfones (such as Udel® available from Amoco Performance Products Inc.), polyacrylates, and cyclic olefin polymers (such as Arton® available from JSR Corp., Zeonex® or Zeonor® available from Nippon Zeon, and Topas® supplied by Ticona), among others. Preferably, the low birefringence protective polymer film of the invention comprises TAC, polycarbonate, poly(methyl methacrylate), or cyclic olefin polymers due their commercial availability and excellent optical properties.

The low birefringence protective polymer film has a thickness from about 5 to 200 micrometers, preferably from about 5 to 80 micrometers and most preferably from about 20 to 80 micrometers. Films having thickness of 20 to 80 micrometers are most preferred due to cost, handling, and the ability to fabricate thinner polarizer plates. In a preferred embodiment of the current invention, polarizer plates assembled from cover sheets of the invention have a total thickness of less than 120 micrometers, and most preferably less than 80 micrometers.

In a preferred embodiment, the layer promoting adhesion to PVA comprises a hydrophilic polymer. Hydrophilic polymers suitable for the purpose of the present invention include both synthetic and natural polymers. Naturally occurring polymers include proteins, protein derivatives, cellulose derivatives (e.g. cellulose esters), polysaccharides, casein, and the like, and synthetic polymers include poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl sulfonic acid copolymers, vinyl imidazole copolymers, vinyl sulfide copolymers, homopolymer or copolymers containing styrene sulfonic acid, and the like.

Preferably, the hydrophilic polymer is water-soluble. The most preferred hydrophilic polymers are poly(vinyl alcohol) and its derivatives. Particularly preferred poly(vinyl alcohol) polymers have a degree of hydrolysis of between 75 and 100% and have a weight average molecular weight of greater than 10,000.

In one particular embodiment, the layer promoting adhesion to poly(vinyl alcohol) films may further comprise hydrophobic polymer particles such as water dispersible polymers and polymer latexes. Preferably these polymer particles contain hydrogen-bonding accepting groups, which includes hydroxyl, carboxyl, amino, or sulfonyl moieties; Suitable polymer particles comprise addition-type polymers and interpolymers prepared from ethylenically unsaturated monomers such as acrylates including acrylic acid, methacrylates including methacrylic acid, acrylamides and methacrylamides, itaconic acid and its half esters and diesters, styrenes including substituted styrenes, acrylonitrile and methacrylonitrile, vinyl acetates, vinyl ethers, vinyl and vinylidene halides, and olefins. In addition, crosslinking and graft-linking monomers such as 1,4-butyleneglycol methacrylate, trimethylolpropane triacrylate, allyl methacrylate, diallyl phthalate, divinyl benzene, and the like may be used. Other suitable polymer dispersions are polyurethane dispersions or polyester ionomer dispersions, polyurethane/vinyl polymer dispersions, and fluoropolymer dispersions. Preferably, polymers for use in the polymer particles have a weight average molecular weight of greater than about 10,000 and a glass transition temperature (Tg) of less than about 25° C. In general, high molecular weight, low Tg polymer particles provide improved adhesion of the layer to both PVA dichroic films and an optional tie layer.

These polymer particles have a particle size in the range of from 10 nanometers to 1 micron, preferably from 10 to 500 nanometers, and most preferably from 10 to 200 nanometers. Suitably, the polymer particles comprise between 10 and 40 weight % of the layer promoting adhesion to PVA in such an embodiment.

The layer promoting adhesion to PVA may also contain a crosslinking agent. Crosslinking agents useful for the practice of the invention include any compounds that are capable of reacting with reactive moieties present on the water-soluble polymer and/or polymer particles. Such crosslinking agents include aldehydes and related compounds, pyridiniums, olefins such as bis(vinylsulfonyl methyl)ether, carbodiimides, epoxides, triazines, polyfunctional aziridines, methoxyalkyl melamines, polyisocyanates, and the like. These compounds can be readily prepared using the published synthetic procedure or routine modifications that would be readily apparent to one skilled in the art of synthetic organic chemistry. Additional crosslinking agents that may also be successfully employed in the layer promoting adhesion to PVA include multivalent metal ion such as zinc, calcium, zirconium and titanium.

The layer promoting adhesion to PVA is typically applied at a dried coating weight of 5 to 300 mg/ft$^2$ (50 to 3000 mg/m$^2$), preferably 5 to 100 mg/ft$^2$ (50 to 1000 mg/m$^2$). The layer is highly transparent and, preferably, has a light transmission of greater than 95%.

For the guarded cover sheet composites used in the invention, preferably, the layer promoting adhesion to PVA is on the same side of the low birefringence protective polymer film as the carrier substrate. Most preferably, the layer promoting adhesion to PVA is applied directly onto the carrier substrate or onto a subbing layer on the carrier substrate. The layer promoting adhesion to PVA may be coated in a separate coating application or it may be applied simultaneously with one or more other layers.

In order to provide good wetting by the water-based glues that may be employed to laminate the cover sheets used in the invention to PVA dichroic films it is preferred that the PVA adhesion promoting layer has a water contact angle of less than 20°. The adhesion promoting layer also preferably has a water swell (at 25° C.) of between 10 and 1000%, preferably at least 20 percent, to promote good contact and perhaps intermixing of the adhesion promoting layer with the glue and/or PVA dichroic film.

An optional tie layer comprises, preferably in an amount of at least 50 weight %, a polymer having an acid number of between 20 and 300, preferably 50 to 200. It is suitably soluble in a variety of common organic solvents at 20° C. The acid functionality is a carboxylic acid (a carboxy group, also known as a carboxyl group). Polymers suitable for use in the tie layer include copolymers (including interpolymers) of ethylenically unsaturated monomers comprising carboxylic acid groups, acid-containing cellulosic polymers such as cellulose acid phthalate and cellulose acetate trimellitate, polyurethanes having carboxylic acid groups, and others. Suitable copolymers of ethylenically unsaturated monomers comprising carboxylic acid groups include acrylates including acrylic acid, methacrylates including methacrylic acid, acrylamides and methacrylamides, itaconic acid and its half esters and diesters, styrenes including substituted styrenes, acrylonitrile and methacrylonitrile, vinyl acetates, vinyl ethers, vinyl and vinylidene halides, and olefins. Preferably, the glass transition temperature of the carboxy-functional polymer is greater than 20° C.

Organic solvents suitable for solubilizing and coating the tie layer polymer include chlorinated solvents (methylene chloride and 1,2 dichloroethane), alcohols (methanol, ethanol, n-propanol, isopropanol, n-butanol, isobutanol, diacetone alcohol and cyclohexanol), ketones (acetone, methylethyl ketone, methylisobutyl ketone, and cyclohexanone), esters (methyl acetate, ethyl acetate, n-propyl acetate, isopropyl acetate, isobutyl acetate, n-butyl acetate, and methylacetoacetate), aromatics (toluene and xylenes) and ethers (1,3-dioxolane, 1,2-dioxolane, 1,3-dioxane, 1,4-dioxane, and 1,5-dioxane). In some applications, small amounts of water may be used. Normally, the coating solutions are prepared with a blend of the aforementioned solvents. Preferred primary solvents include methylene chloride, acetone, methyl acetate, and 1,3-dioxolane. Preferred co-solvents for use with the primary solvents include methanol, ethanol, n-butanol and water. Preferably, the tie layer polymer is applied from the same or at least compatible solvent mixture to the low birefringence protective polymer.

The optional tie layer may also contain a crosslinking agent. Crosslinking agents useful for the practice of the invention include any compounds that are capable of reacting with reactive moieties present on the polymer, particularly carboxylic acid. Such crosslinking agents include boron-containing compounds such as borates, aldehydes and related compounds, pyridiniums, olefins such as bis(vinylsulfonyl methyl)ether, carbodiimides, polyfunctional epoxides, triazines, polyfunctional aziridines, methoxyalkyl melamines, melamine-formaldehyde resins, polyisocyanates, and the like, or mixtures thereof. These compounds can be readily prepared using the published synthetic procedure or routine modifications that would be readily apparent to one skilled in the art of synthetic organic chemistry. Additional crosslinking agents that may also be successfully employed in the layer include multivalent metal ion such as zinc, calcium, zirconium and titanium.

The optional tie layer is typically applied at a dried coating weight of 5 to 500 mg/ft$^2$ (50 to 5000 mg/m$^2$), preferably 50 to 500 mg/ft$^2$ (500 to 5000 mg/m$^2$) and has a thickness of preferably 0.5 to 5 micrometers. The layer is highly transparent and, preferably, has a light transmission of greater than 95%.

Generally, the tie layer is applied onto an already coated and dried layer promoting adhesion to PVA. The tie layer may be coated in a separate coating application or it may be applied simultaneously with one or more other layers. Preferably, for best adherence, the tie layer is applied simultaneously with the low birefringence protective polymer layer.

Carrier substrates suitable for the use in the present invention include polyethylene terephthalate (PET), polyethylene naphthalate (PEN), polycarbonate, polystyrene, and other polymeric films. Additional substrates may include paper, laminates of paper and polymeric films, glass, cloth, aluminum and other metal supports. Preferably, the carrier substrate is a polyester film comprising polyethylene terephthalate (PET) or polyethylene naphthalate (PEN). The thickness of the carrier substrate is about 20 to 200 micrometers, typically about 40 to 100 micrometers. Thinner carrier substrates are desirable due to both cost and the weight per roll of guarded cover sheet composite. However, carrier substrates less than about 20 micrometers may not provide sufficient dimensional stability or protection for the cover she et.

The carrier substrate may be coated with one or more subbing layers or may be pretreated with electrical discharge devices to enhance the wetting of the substrate by coating solutions. Since the cover sheet must ultimately be peeled from the carrier substrate the adhesion between cover sheet and substrate is an important consideration. Subbing layers and electrical discharge devices may also be employed to modify the adhesion of the cover sheet to the carrier substrate. Subbing layers may therefore function as either primer layers to improve wetting or release layers to modify the adhesion of the cover sheet to the substrate. The carrier substrate may be coated with two subbing layers, the first layer acting as a primer layer to improve wetting and the second layer acting as a release layer. The thickness of the subbing layer is typically 0.05 to 5 micrometers, preferably 0.1 to 1 micrometers.

Cover sheet/substrate composites having poor adhesion might be prone to blister after application of a second or third wet coating in a multi-pass operation. To avoid blister defects, adhesion should be greater than about 0.3 N/m between the first-pass layer of the cover sheet and the carrier substrate. As already mentioned, the level of adhesion may be modified by a variety of web treatments including various subbing layers and various electronic discharge treatments. However, excessive adhesion between the cover sheet and substrate is also undesirable since the cover sheet may be damaged during subsequent peeling operations. In particular, cover sheet/substrate composites having too great an adhesive force may peel poorly. The maximum adhesive force that allows acceptable peel behavior is dependent on the thickness and tensile properties of the cover sheet. Typically, an adhesive force between the cover sheet and the substrate greater than about 300 N/m may peel poorly. Cover sheets peeled from such excessively well-adhered composites exhibit defects due to tearing of the cover sheet and/or due to cohesive failure within the sheet. In a preferred embodiment, the adhesion between the cover sheet and the carrier substrate is less than 250 N/m. Most preferably, the adhesion between the cover sheet and the carrier substrate is between 0.5 and 25 N/m.

In a preferred embodiment, the carrier substrate is a polyethylene terephthalate film having a first subbing layer (primer layer) comprising a vinylidene chloride copolymer and second subbing layer (release layer) comprising polyvinyl butyral. In another preferred embodiment, the carrier substrate is polyethylene terephthalate film that has been pretreated with a corona discharge prior to application of the cover sheet.

Substrates may also have functional layers such as antistatic layers containing various polymer binders and conductive addenda in order to control static charging and dirt and dust attraction. The antistatic layer may be on either side of the carrier substrate, preferably it is on the side of the carrier substrate opposite to the cover sheet.

On the side of the substrate opposite to the cover sheet a backing layer may also be employed in order to provide a surface having appropriate roughness and coefficient of friction for good winding and conveyance characteristics. In particular, the backing layer comprises a polymeric binder such as a polyurethane or acrylic polymer containing matting agent such a silica or polymeric beads. The matting agent helps to prevent the sticking of the front side of the guarded cover sheet composite to the backside during shipping and storage. The backing layer may also comprise a lubricant to provide a coefficient of friction of about 0.2 to 0.4. Typical lubricants include for example (1) liquid paraffin and paraffin or wax like materials such as carnauba wax, natural and synthetic waxes, petroleum waxes, mineral waxes and the like; (2) higher fatty acids and derivatives, higher alcohols and derivatives, metal salts of higher fatty acids, higher fatty acid esters, higher fatty acid amides, polyhydric alcohol esters of higher fatty acids, etc., disclosed in U.S. Pat. Nos. 2,454,043; 2,732,305; 2,976,148; 3,206,311; 3,933,516; 2,588,765; 3,121,060; 3,502,473; 3,042,222; and 4,427,964, in British Patents 1,263,722; 1,198,387; 1,430,997; 1,466,304; 1,320,757; 1,320,565; and 1,320,756; and in German Patents 1,284,295 and 1,284,294; (3) perfluoro- or fluoro- or fluorochloro-containing materials, which include poly(tetrafluoroethylene), poly(trifluorochloroethylene), poly(vinylidene fluoride, poly(trifluorochloroethylene-co-vinyl chloride), poly(meth)acrylates or poly(meth)acrylamides containing perfluoroalkyl side groups, and the like. However for lasting lubricity a polymerizable lubricant such as Additive 31, a methacryloxy-functional silicone polyether copolymer (from Dow Corning Corp.) is preferred.

In a preferred embodiment the guarded cover sheet composite comprises a strippable, protection layer on the surface of the cover sheet opposite to the carrier substrate. The strippable, protection layer may be applied by coating the layer or it may be applied by adhesively adhering or by electrostatically adhering, a preformed protection layer. Preferably, the protection layer is a transparent polymer layer. In one particular embodiment, the protection layer is a low birefringence layer that allows optical inspection of the cover sheet without the need to remove the protection layer. Particularly useful polymers for use in the protection layer include: cellulose esters, acrylics, polyurethanes, polyesters, cyclic olefin polymers, polystyrene, polyvinyl butyral, polycarbonate, and others. When a preformed protection layer is used, it is preferably a layer of polyester, polystyrene, or polyolefin film.

The strippable, protection layer is typically 5 to 100 micrometers in thickness. Preferably, the protection layer is 20 to 50 micrometers thick to insure adequate resistance to scratch and abrasion and provide easy handling during removal of the protection layer.

When the strippable, protection layer is applied by coating methods it may be applied to an already coated and dried cover sheet or the protection layer may be coated simultaneously with one or more layers comprising the cover sheet.

When the strippable, protection layer is a preformed layer it may have a pressure sensitive adhesive layer on one surface that allows the protection layer to be adhesively laminated to the guarded cover sheet composite using conventional lamination techniques. Alternatively, the preformed protection layer may be applied by generating an electrostatic charge on a surface of the cover sheet or the preformed protection layer and then bringing the two materials into contact in a roller nip. The electrostatic charge may be generated by any known electric charge generator, e.g., a corona charger, a tribocharger, conducting high potential roll charge generator or contact charger, a static charge generator, and the like. The cover sheet or the preformed protection layer may be charged with a DC charge or a DC charge followed by an AC charge in order to create an adequate level of charge adhesion between the two surfaces. The level of electrostatic charge applied to provide a sufficient bond between the cover sheet and the preformed protection layer is at least more than 50 volts, preferably at least more than 200 volts. The charged surface of the cover sheet or the protection layer has a resistivity of at least about $10^{12}$ Ω/square, preferably at least about $10^{16}$ Ω/square in order to insure that the electrostatic charge is long lasting.

Each protective cover sheet may have various auxiliary layers that are necessary to improve the performance of a Liquid Crystal Display. Liquid Crystal Displays typically employ two polarizer plates, one on each side of the liquid crystal cell. Each polarizer plate, in turn, employs two cover sheets, one on each side of the PVA dichroic film. These cover sheets may be different, for example, contain a different subset of possible auxiliary layers.

Useful auxiliary layers employed in the cover sheets used in the present method or element can, for example, include: abrasion resistant hardcoat layer, antiglare layer, anti-smudge layer or stain-resistant layer, antireflection layer, low reflection layer, antistatic layer, viewing angle compensation layer, and moisture barrier layer. Typically, the cover sheet closest to the viewer contains one or more of the following auxiliary layers: the abrasion resistant layer, anti-smudge or stain-resistant layer, antireflection layer, and antiglare layer. One or both of the cover sheets closest to the liquid crystal cell typically contain a viewing angle compensation layer. Any or all of the four cover sheets employed in the LCD may optionally contain an antistatic layer and a moisture barrier layer.

The cover sheets may contain an abrasion resistant layer on the opposite side of the low birefringence protective polymer film to the layer promoting adhesion to PVA.

Particularly effective abrasion resistant layers comprise radiation or thermally cured compositions, and preferably the composition is radiation cured. Ultraviolet (UV) radiation and electron beam radiation are the most commonly employed radiation curing methods. UV curable compositions are particularly useful for creating the abrasion resistant layer and may be cured using two major types of curing chemistries, free radical chemistry and cationic chemistry. Acrylate monomers (reactive diluents) and oligomers (reactive resins and lacquers) are the primary components of the free radical based formulations, giving the cured coating most of its physical characteristics. Photo-initiators are required to absorb the UV light energy, decompose to form free radicals, and attack the acrylate group C=C double bond to initiate polymerization. Cationic chemistry utilizes cycloaliphatic epoxy resins and vinyl ether monomers as the primary components. Photo-initiators absorb the UV light to form a Lewis acid, which attacks the epoxy ring initiating polymerization. By UV curing is meant ultraviolet curing and involves the use of UV radiation of wavelengths between 280 and 420 nm preferably between 320 and 410 nm.

Examples of UV radiation curable resins and lacquers usable for the abrasion resistant layer useful in this invention are those derived from photo polymerizable monomers and oligomers such as acrylate and methacrylate oligomers (the term "(meth)acrylate" used herein refers to acrylate and methacrylate), of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth) acrylate, pentaerythritol tetra(meth)acrylate, pentaerythritol tri(meth)acrylate, dipentaerythritol hexa(meth)acrylate, 1,6-hexanediol di(meth)acrylate, or neopentyl glycol di(meth) acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin, and the like and mixtures thereof, and ionizing radiation-curable resins containing a relatively large amount of a reactive diluent. Reactive diluents usable herein include monofunctional monomers, such as ethyl(meth)acrylate, ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth) acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth) acrylate.

Among others, conveniently used radiation curable lacquers, for use in abrasion resistant layers, include urethane (meth)acrylate oligomers. These are derived from reacting diisocyanates with an oligo(poly)ester or oligo(poly)ether polyol to yield an isocyanate terminated urethane. Subsequently, hydroxy terminated acrylates are reacted with the terminal isocyanate groups. This acrylation provides the unsaturation to the ends of the oligomer. The aliphatic or aromatic nature of the urethane acrylate is determined by the choice of diisocyanates. An aromatic diisocyanate, such as toluene diisocyanate, will yield an aromatic urethane acrylate oligomer. An aliphatic urethane acrylate will result from the selection of an aliphatic diisocyanate, such as isophorone diisocyanate or hexyl methyl diisocyanate. Beyond the choice of isocyanate, polyol backbone plays a pivotal role in determining the performance of the final the oligomer. Polyols are generally classified as esters, ethers, or a combination of these two. The oligomer backbone is terminated by two or more acrylate or methacrylate units, which serve as reactive sites for free radical initiated polymerization. Choices among isocyanates, polyols, and acrylate or methacrylate termination units allow considerable latitude in the development of urethane acrylate oligomers. Urethane acrylates, like most oligomers, are typically high in molecular weight and viscosity. These oligomers are multifunctional and contain multiple reactive sites. Because of the increased number of reactive sites, the cure rate is improved and the final product is cross-linked. The oligomer functionality can vary from 2 to 6.

Among others, conveniently used radiation curable resins, for use in abrasion resistant layers, also include polyfunctional acrylic compounds derived from polyhydric alcohols and their derivatives such as mixtures of acrylate derivatives of pentaerythritol such as pentaerythritol tetraacrylate and pentaerythritol triacrylate functionalized aliphatic urethanes derived from isophorone diisocyanate. Some examples of urethane acrylate oligomers used in the practice of this invention that are commercially available include oligomers from Sartomer Company (Exton, Pa.). An example of a resin that is conveniently used in the practice of this invention is CN 968® from Sartomer Company.

In one embodiment, an abrasion resistant layer includes a photo polymerization initiator, such as an acetophenone compound, a benzophenone compound, Michler's benzoyl benzoate, α-amyloxime ester, or a thioxanthone compound and a photosensitizer such as n-butyl amine, triethylamine, or tri-n-butyl phosphine, or a mixture thereof is incorporated in the ultraviolet radiation curing composition. Conveniently used initiators are 1-hydroxycyclohexyl phenyl ketone and 2-methyl-1-[4-(methyl thio)phenyl]-2-morpholinopropanone-1.

The abrasion resistant layer is typically applied after coating and drying the low birefringence protective polymer film. The abrasion resistant layer is applied as a coating composition that typically also includes organic solvents. Preferably the concentration of organic solvent is 1-99% by weight of the total coating composition.

Examples of solvents employable for coating the abrasion resistant layer include solvents such as methanol, ethanol, propanol, butanol, cyclohexane, heptane, toluene and xylene, esters such as methyl acetate, ethyl acetate, propyl acetate and mixtures thereof. With the proper choice of solvent, adhesion of the abrasion resistant layer can be improved while minimizing migration of plasticizers and other addenda from the low birefringence protective polymer film, enabling the hardness of the abrasion resistant layer to be maintained. Suitable solvents for TAC low birefringence protective polymer film are aromatic hydrocarbon and ester solvents such as toluene and propyl acetate.

The UV polymerizable monomers and oligomers are coated and dried, and subsequently exposed to UV radiation to form an optically clear cross-linked abrasion resistant layer. The preferred UV cure dosage is between 50 and 1000 mJ/cm$^2$.

The thickness of the abrasion resistant layer is generally about 0.5 to 50 micrometers preferably 1 to 20 micrometers, more preferably 2 to 10 micrometers.

The abrasion resistant layer is preferably colorless, but it is specifically contemplated that this layer can have some color for the purposes of color correction, or for special effects, so long as it does not detrimentally affect the formation or viewing of the display through the overcoat. Thus, there can be incorporated into the polymer dyes that will impart color. In addition, additives can be incorporated into the polymer that will give to the layer desired properties. Other additional compounds may be added to the coating composition, including surfactants, emulsifiers, coating aids, lubricants, matte particles, rheology modifiers, crosslinking agents, antifoggants, inorganic fillers such as conductive and nonconductive metal oxide particles, pigments, magnetic particles, biocide, and the like.

The abrasion resistant layer typically provides a layer having a pencil hardness (using the Standard Test Method for Hardness by Pencil Test ASTM D3363) of at least 2H and preferably 2H to 8H.

The cover sheets used in the invention may contain an antiglare layer, a low reflection layer or an antireflection layer on the same side of the carrier substrate as the low birefringence protective polymer film. The antiglare layer, low reflection layer or antireflection layer is located on the opposite side of the low birefringence protective polymer film to the layer promoting adhesion to PVA. Such layers are employed in an LCD in order to improve the viewing characteristics of the display, particularly when it is viewed in bright ambient light. The refractive index of an abrasion resistant, hard coat is about 1.50, while the index of the surrounding air is 1.00. This difference in refractive index produces a reflection from the surface of about 4%.

An antiglare coating provides a roughened or textured surface that is used to reduce specular reflection. All of the unwanted reflected light is still present, but it is scattered rather than specularly reflected. The antiglare coating preferably comprises a radiation cured composition that has a textured or roughened surface obtained by the addition of organic or inorganic (matting) particles or by embossing the surface. The radiation cured compositions described hereinabove for the abrasion resistant layer are also effectively employed in the antiglare layer. Surface roughness is preferably obtained by the addition of matting particles to the radiation cured composition. Suitable particles include inorganic compounds having an oxide, nitride, sulfide or halide of a metal, metal oxides being particularly preferred. As the metal atom, Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni are suitable, and Mg, Ca, B and Si are more preferable. An inorganic compound containing two types of metal may also be used. A particularly preferable inorganic compound is silicon dioxide, namely silica.

Additional particles suitable for use in the antiglare layer include the layered clays described in commonly-assigned U.S. patent application Ser. No. 10/690,123, filed Oct. 21, 2003. The most suitable layered particles include materials in the shape of plates with high aspect ratio, which is the ratio of a long direction to a short direction in an asymmetric particle. Preferred layered particles are natural clays, especially natural smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred clay materials include natural montmorillonite, hectorite and hydrotalcites, because of commercial availability of these materials.

The layered materials suitable for the antiglare layer may comprise phyllosilicates, for example, montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials may include illite, mixed layered illite/smectite minerals, such as ledikite and admixtures of illites with the layered materials named above. Other useful layered materials, particularly useful with anionic matrix polymers, may include the layered double hydroxide clays or hydrotalcites, such as $Mg_6Al_{3.4}(OH)_{18.8}(CO_3)_{1.7}H_2O$, which have positively charged layers and exchangeable anions in the interlayer spaces. Preferred layered materials are swellable so that other agents, usually organic ions or molecules, may splay, that is, intercalate and/or exfoliate, the layered material resulting in a desirable dispersion of the inorganic phase. These swellable layered materials include phyllosilicates of the 2:1 type, as defined in the literature (for example, "An introduction to clay colloid chemistry," by H. van Olphen, John Wiley & Sons Publishers). Typical phyllosilicates with ion exchange capacity of 50 to 300 milliequivalents per 100 grams are preferred. Generally, it is desirable to treat the selected clay material to separate the agglomerates of platelet particles to small crystals, also called tactoids, prior to introducing the platelet particles to the antiglare coating. Predispersing or separating the platelet particles also improves the binder/platelet interface. Any treatment that achieves the above goals may be used. Examples of useful treatments include intercalation with water-soluble or water insoluble polymers, organic reagents or monomers, silane compounds, metals or organometallics, organic cations to effect cation exchange, and their combinations.

Additional particles for use in the antiglare layer include polymer matte particles or beads which are well known in the art. The polymer particles may be solid or porous, preferably crosslinked polymer particles. Porous polymer particles for use in an antiglare layer are described in commonly-assigned U.S. patent application Ser. No. 10/715,706, filed Nov. 18, 2003.

In a preferred embodiment, particles for use in the antiglare layer have an average particle size ranging from 2 to 20 micrometers, preferably from 2 to 15 micrometers and most preferably from 4 to 10 micrometers. They are present in the layer in an amount of at least 2 wt percent and less than 50 percent, typically from about 2 to 40 wt. percent, preferably from 2 to 20 percent and most preferably from 2 to 10 percent.

The thickness of the antiglare layer is generally about 0.5 to 50 micrometers preferably 1 to 20 micrometers more preferably 2 to 10 micrometers.

Preferably, the antiglare layer has a 60° Gloss value, according to ASTM D523, of less than 100, preferably less than 90 and a transmission haze value, according to ASTM D-1003 and JIS K-7105 methods, of less than 50%, preferably less than 30%.

In another embodiment of elements made in accordance with the present invention, a low reflection layer or antireflection layer is used in combination with an abrasion resistant hard coat layer or antiglare layer. The low reflection or antireflection coating is applied on top of the abrasion resistant or antiglare layer. Typically, a low reflection layer provides an average specular reflectance (as measured by a spectrophotometer and averaged over the wavelength range of 450 to 650 nm) of less than 2%. Antireflection layers provide average specular reflectance values of less than 1%.

Suitable low reflection layers can comprise fluorine-containing homopolymers or copolymers having a refractive index of less than 1.48, preferably with a refractive index between about 1.35 and 1.40. Suitable fluorine-containing homopolymers and copolymers include: fluoro-olefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid, and completely or partially fluorinated vinyl ethers, and the like. The effectiveness of the layer may be improved by the incorporation of submicron-sized inorganic particles or polymer particles that induce interstitial air voids within the coating. This technique is further described in U.S. Pat. No. 6,210,858 and U.S. Pat. No. 5,919,555. Further improvement of the effectiveness of the low reflection layer may be realized with the restriction of air voids to the internal particle space of submicron-sized polymer particles with reduced coating haze penalty, as described in commonly-assigned U.S. patent application Ser. No. 10/715,655, filed Nov. 18, 2003.

The thickness of the low reflection layer is 0.01 to 1 micrometer and preferably 0.05 to 0.2 micrometer.

An antireflection layer may comprise a monolayer or a multi-layer. Antireflection layers comprising a monolayer typically provide reflectance values less than 1% at only a single wavelength (within the broader range of 450 to 650 nm). A commonly employed monolayer antireflection coating that is suitable for use in the present invention comprises a layer of a metal fluoride such as magnesium fluoride (MgF$_2$). The layer may be applied by well-known vacuum deposition technique or by a sol-gel technique. Typically, such a layer has an optical thickness (i.e., the product of refractive index of the layer times layer thickness) of approximately one quarter-wavelength at the wavelength where a reflectance minimum is desired.

Although a monolayer can effectively reduce the reflection of light within a very narrow wavelength range, more often a multi-layer comprising several (typically, metal oxide based) transparent layers superimposed on one another is used to reduce reflection over a wide wavelength region (i.e., broadband reflection control). For such a structure, half wavelength layers are alternated with quarter wavelength layers to improve-performance. The multi-layer antireflection coating may comprise two, three, four, or even more layers. Formation of this multi-layer typically requires a complicated process comprising a number of vapor deposition procedures or sol-gel coatings, which correspond to the number of layers, each layer having a predetermined refractive index and thickness. Precise control of the thickness of each layer is required for these interference layers. The design of suitable multi-layer antireflection coatings for use in the present invention is well known in the patent and technical literature, as well as being described in various textbooks, for example, in H. A. Macleod, "Thin Film Optical Filters," Adam Hilger, Ltd., Bristol 1985 and James D. Rancourt, "Optical Thin Films User's Handbook", Macmillan Publishing Company, 1987.

The cover sheets that can be used in the invention may also contain a moisture barrier layer. The moisture barrier layer comprises a hydrophobic polymer such as a vinylidene chloride polymer, vinylidene fluoride polymer, polyurethane, polyolefin, fluorinated polyolefin, polycarbonate, and others, having a low moisture permeability. Preferably, the hydrophobic polymer comprises vinylidene chloride. More preferably, the hydrophobic polymer comprises 70 to 99 weight percent of vinylidene chloride. The moisture barrier layer may be applied by application of an organic solvent-based or aqueous coating formulation. To provide effective moisture barrier properties the layer should be at least 1 micrometer in thickness, preferably from 1 to 10 micrometers in thickness, and most preferably from 2 to 8 micrometers in thickness. Such a cover sheet comprising a moisture barrier layer has a moisture vapor transmission rate (MVTR) according to ASTM F-1249 that is less than 1000 g/m$^2$/day, preferably less than 800 g/m$^2$/day and most preferably less than 500 g/m$^2$/day. The use of such a barrier layer in the cover sheet provides improved resistance to changes in humidity and increased durability of the polarizer plate comprising the cover sheet, especially for TAC cover sheets having a thickness less than about 40 micrometers.

The cover sheets used in the invention may also contain a transparent antistatic layer. The antistatic layer aids in the control of static charging that may occur during the manufacture and use of the cover sheet composite. Effective control of static charging reduces the propensity for the attraction of dirt and dust to the cover sheet composite. The guarded cover sheet composite may be particularly prone to triboelectric charging during the peeling of the cover sheet from the carrier substrate. The so-called "separation charge" that results from the separation of the cover sheet and the substrate can be effectively controlled by an antistatic layer having a resistivity of less than about $1 \times 10^{11}$ Ω/square, preferably less than $1 \times 10^{10}$ Ω/square, and most preferably less than $1 \times 10^{9}$ Ω/square.

Various polymeric binders and conductive materials may be employed in the antistatic layer. Polymeric binders useful in the antistatic layer include any of the polymers commonly used in the coating art, for example, interpolymers of ethylenically unsaturated monomers, cellulose derivatives, polyurethanes, polyesters, hydrophilic colloids such as gelatin, poly(vinyl alcohol), polyvinyl pyrrolidone, and others.

Conductive materials employed in the antistatic layer may be either ionically-conductive or electronically-conductive. Ionically-conductive materials include simple inorganic salts, alkali metal salts of surfactants, polymeric electrolytes containing alkali metal salts, and colloidal metal oxide sols (stabilized by metal salts). Of these, ionically-conductive polymers such as anionic alkali metal salts of styrene sulfonic acid copolymers and cationic quaternary ammonium polymers of U.S. Pat. No. 4,070,189 and ionically-conductive colloidal metal oxide sols which include silica, tin oxide, titania, antimony oxide, zirconium oxide, alumina-coated silica, alumina, boehmite, and smectite clays are preferred.

The antistatic layer that can be employed in the current invention preferably contains an electronically-conductive material due to their humidity and temperature independent conductivity. Suitable materials include:

(1) electronically-conductive metal-containing particles including donor-doped metal oxides, metal oxides containing oxygen deficiencies, and conductive nitrides, carbides, and bromides. Specific examples of particularly useful particles include conductive $SnO_2$, $In_2O$, $ZnSb_2O_6$, $InSbO_4$, $TiB_2$, $ZrB_2$, $NbB_2$, $TaB_2$, $CrB$, $MoB$, $WB$, $LaB_6$, $ZrN$, $TiN$, $WC$, $HfC$, $HfN$, and $ZrC$. Examples of the patents describing these electrically conductive particles include; U.S. Pat. Nos. 4,275,103; 4,394,441; 4,416,963; 4,418,141; 4,431,764; 4,495,276; 4,571,361; 4,999,276; 5,122,445; and 5,368,995;

(2) fibrous electronic conductive particles comprising, for example, antimony-doped tin oxide coated onto non-conductive potassium titanate whiskers as described in U.S. Pat. Nos. 4,845,369 and 5,166,666, antimony-doped tin oxide fibers or whiskers as described in U.S. Pat. Nos. 5,719,016 and 5,0731,119, and the silver-doped vanadium pentoxide fibers described in U.S. Pat. No. 4,203,769; and (3) electronically-conductive polyacetylenes, polythiophenes, and polypyrroles, preferably the polyethylene dioxythiophene described in U.S. Pat. No. 5,370,981 and commercially available from Bayer Corp. as Baytron® P.

The amount of the conductive agent used in the antistatic layer can vary widely depending on the conductive agent employed. For example, useful amounts range from about 0.5 mg/m$^2$ to about 1000 mg/m$^2$, preferably from about 1 mg/m$^2$ to about 500 mg/m$^2$. The antistatic layer has a thickness of from 0.05 to 5 micrometers, preferably from 0.1 to 0.5 micrometers to insure high transparency.

The cover sheets used in the invention may contain a viewing angle compensation layer (also referred to as a compensation layer, retarder layer, or phase difference layer), with proper optical properties, between the PVA dichroic film and liquid crystal cell, such as disclosed in U.S. Pat. Nos. 5,583,679, 5,853,801, 5,619,352, 5,978,055, and 6,160,597. A compensation film according to U.S. Pat. Nos. 5,583,679 and 5,853,801 based on discotic liquid crystals which have negative birefringence, is widely used.

Compensation films are used to improve the viewing angle characteristic, which describes a change in contrast ratio from different viewing angles. It is desirable to be able to see the same image from a wide variation in viewing angles and this ability has been a shortcoming with liquid crystal display devices. The primary factor limiting the contrast of a liquid crystal display is the propensity for light to "leak" through liquid crystal elements or cells, which are in the dark or "black" pixel state. Furthermore, the leakage and hence contrast of a liquid crystal display are also dependent on the direction from which the display screen is viewed. Typically the optimum contrast is observed only within a narrow viewing angle range centered about the normal incidence to the display and falls off rapidly as the viewing direction deviates from the display normal. In color displays, the leakage problem not only degrades the contrast but also causes color or hue shifts with an associated degradation of color reproduction.

Viewing angle compensation layers useful in the present invention are optically anisotropic layers. The optically anisotropic, viewing angle compensation layers may comprise positively birefringent materials or negatively birefringent materials. The compensation layer may be optically uniaxial or optically biaxial. The compensation layer may have its optic axis tilted in the plane perpendicular to the layer. The tilt of the optic axis may be constant in the layer thickness direction or the tilt of the optic axis may vary in the layer thickness direction.

Optically anisotropic, viewing angle compensation layers useful in the present invention may comprise the negatively birefringent, discotic liquid crystals described in U.S. Pat. Nos. 5,583,679, and 5,853,801; the positively birefringent nematic liquid crystals described in U.S. Pat. No. 6,160,597; the negatively birefringent amorphous polymers described in commonly assigned U.S. Patent Application Publication 2004/0021814A and U.S. patent application Ser. No. 10/745,109, filed Dec. 23, 2003. These latter two patent applications describe compensation layers comprising polymers that contain non-visible chromophore groups such as vinyl, carbonyl, amide, imide, ester, carbonate, sulfone, azo, and aromatic groups (i.e. benzene, naphthalate, biphenyl, bisphenol A) in the polymer backbone and that preferably have a glass transition temperature of greater than 180° C. Such polymers are particularly useful in the compensation layer. Such polymers include polyesters, polycarbonates, polyimides, polyetherimides, and polythiophenes. Of these, particularly preferred polymers include: (1) a poly(4,4'-hexafluoroisopropylidene-bisphenol) terephthalate-co-isophthalate, (2) a poly(4,4'-hexahydro-4,7-methanoindan-5-ylidene bisphenol) terephthalate, (3) a poly(4,4'-isopropylidene-2,2'6,6'-tetrachlorobisphenol) terephthalate-co-isophthalate, (4) a poly(4,4'-hexafluoroisopropylidene)-bisphenol-co-(2-norbornylidene)-bisphenol terephthalate, (5) a poly(4,4'-hexahydro-4,7-methanoindan-5-ylidene)-bisphenol-co-(4,4'-isopropylidene-2,2',6,6'-tetrabromo)-bisphenol terephthalate, (6) a poly(4,4'-isopropylidene-bisphenol-co-4,4'-(2-norbornylidene)bisphenol) terephthalate-co-isophthalate, (7) a poly(4,4'-hexafluoroisopropylidene-bisphenol-co-4,4'-(2-norbornylidene) bisphenol) terephthalate-co-isophthalate, or (8) copolymers of any two or more of the foregoing. A compensation layer comprising these polymers typically has an out-of-plane retardation, $R_{th}$, that is more negative than −20 nm, preferably $R_{th}$ is from −60 to −600 nm, and most preferably $R_{th}$ is from −150 to −500 nm.

Another compensation layer suitable for the present invention includes an optically anisotropic layer comprising an exfoliated inorganic clay material in a polymeric binder as described in Japanese Patent Application 11095208A.

The auxiliary layers that can be used in the invention can be applied by any of a number of well known liquid coating techniques, such as dip coating, rod coating, blade coating, air knife coating, gravure coating, microgravure coating, reverse roll coating, slot coating, extrusion coating, slide coating, curtain coating, or by vacuum deposition techniques. In the case of liquid coating, the wet layer is generally dried by simple evaporation, which may be accelerated by known techniques such as convection heating. The auxiliary layer may be applied simultaneously with other layers such as subbing layers and the low birefringence protective polymer film. Several different auxiliary layers may be coated simultaneously using slide coating, for example, an antistatic layer may be coated simultaneously with a moisture barrier layer or a moisture barrier layer may be coated simultaneously with a viewing angle compensation layer. Known coating and drying methods are described in further detail in Research Disclosure 308119, Published December 1989, pages 1007 to 1008.

The cover sheets that can be used in the present method or polarizer plates are suitable for use with a wide variety of LCD display modes, for example, Twisted Nematic (TN), Super Twisted Nematic (STN), Optically Compensated Bend (OCB), In Plane Switching (IPS), or Vertically Aligned (VA) liquid crystal displays. These various liquid crystal display technologies have been reviewed in U.S. Pat. No. 5,619,352 (Koch et al.), U.S. Pat. No. 5,410,422 (Bos), and U.S. Pat. No. 4,701,028 (Clerc et al.).

Figure 10:
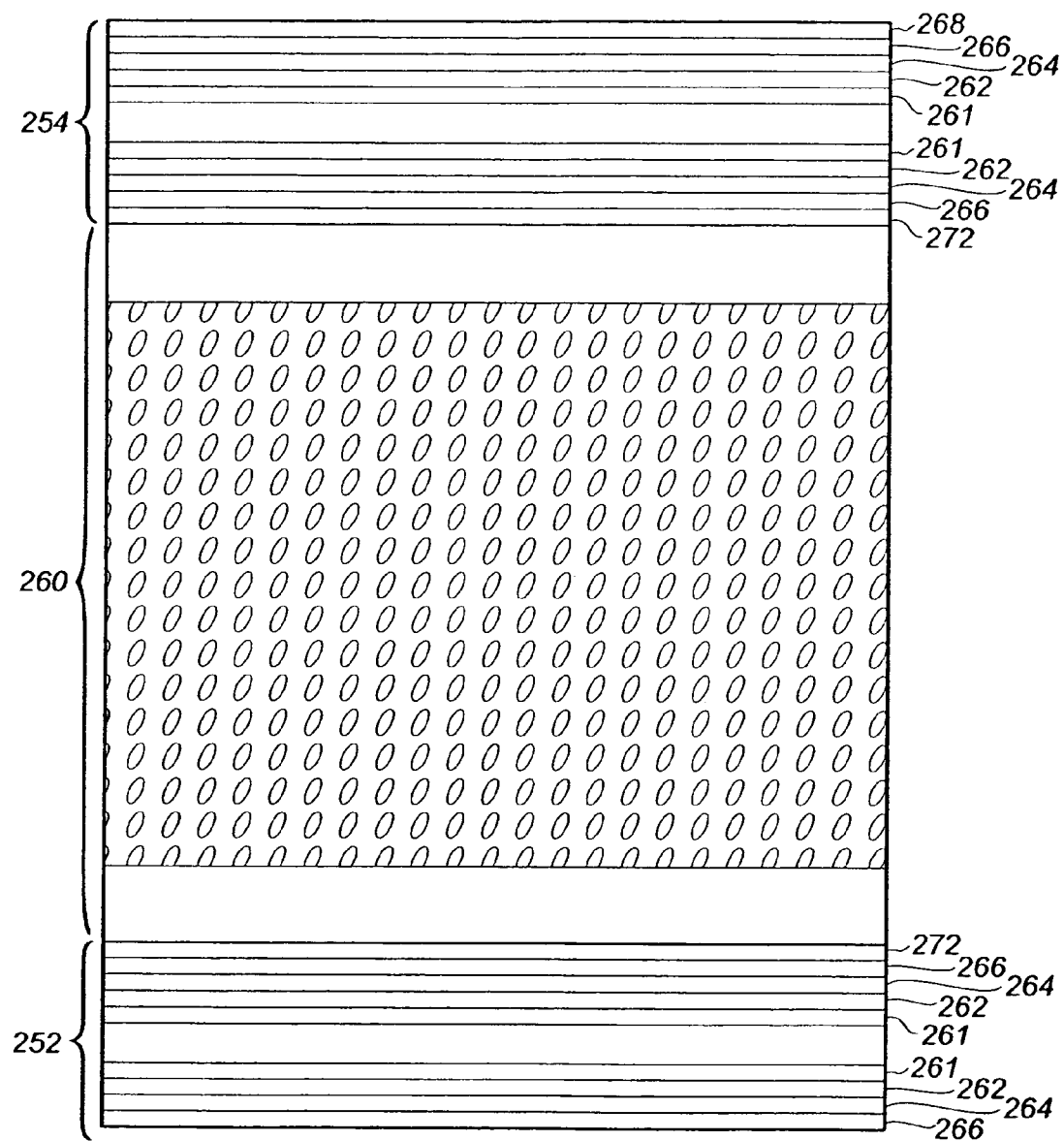
FIG. 10 shows a cross-sectional representation of a liquid crystal cell with polarizer plates on either side of the cell in accordance with the present invention.

FIG. 10 presents a cross-sectional illustration showing one embodiment of a typical liquid crystal cell 260 having polarizer plates 252 and 254 disposed on either side. Polarizer plate 254 is on the side of the LCD cell closest to the viewer. Each polarizer plate employs two cover sheets. For the purpose of illustration, polarizer plate 254 is shown with an uppermost cover sheet (this is the cover sheet closest to the viewer) comprising a layer promoting adhesion to PVA 261, tie layer 262, low birefringence protective polymer film 264, barrier layer 266, and antiglare layer 268. The lowermost cover sheet contained in polarizer plate 254 comprises a layer promoting adhesion to PVA 261, tie layer 262, low birefringence protective polymer film 264, barrier layer 266, and viewing angle compensation layer 272. On the opposite side of the LCD cell, polarizer plate 252 is shown with an uppermost cover sheet, which for the purpose of illustration, comprises a layer promoting adhesion to PVA 261, tie layer 262, low birefringence protective polymer film 264, barrier layer 266, and viewing angle compensation layer 272. Polarizer plate 252 also has a lowermost cover sheet comprising a layer promoting adhesion to PVA 261, tie layer 262, low birefringence protective polymer film 264, and barrier layer 266.

The present invention is illustrated in more detail by the following non-limiting examples.

EXAMPLES

Example 1

A 100 micrometer thick poly(ethylene terephthalate) (PET) carrier substrate having an antistatic backing layer (backside) is coated on its front surface with a layer promoting adhesion to PVA film comprising Cervol® 205 PVA (poly(vinyl alcohol)) having a degree of hydrolysis of about 88-89%, available from Celanese Corp.) having a dry coating weight of about 75 mg/ft² (750 mg/m²), and Neorez® R-600 (polyurethane dispersion from NeoResins Inc.) having a coating weight of about 25 mg/ft² (250 mg/m²). The dried layer is then overcoated with a triacetyl cellulose (TAC) formulation comprising three layers: a surface layer comprising CA-438-80S (triacetyl cellulose from Eastman Chemical) having a dry coating weight of about 208 mg/ft² (2080 mg/m²), diethyl phthalate having a dry coating weight of about 20.8 mg/ft² (208 mg/m²), and Surflon® S-8405-S50 (a fluorinated surfactant from Semi Chemical Co. Ltd) having a dry coating weight of about 21 mg/ft² (210 mg/m²); a middle layer comprising CA-438-80S having a dry coating weight of about 1899 mg/ft² (18990 mg/m²), Surflon® S-8405-S50 having a dry coating weight of about 29.5 mg/ft² (295 mg/m²), diethyl phthalate having a dry coating weight of about 190 mg/ft² (1900 mg/m²), TINUVIN® 8515 UV absorber (a mixture of 2-(2'-Hydroxy-3'-tert-butyl-5'-methylphenyl)-5-chloro benzotriazole and 2-(2'-Hydroxy-3',5'-ditert-butylphenyl)-benzotriazole, available from Ciba Specialty Chemicals) having a dry coating weight of about 84 mg/ft² (840 mg/m²), and PARSOL® 1789 UV absorber (4-(1,1-dimethylethyl)-4'-methoxydibenzoylmethane, available from Roche Vitamins Inc.) having a dry coating weight of about 8.4 mg/ft² (84 mg/m²); a lower layer as the tie layer comprising a mixture of 95:5 cellulose acetate trimellitate (Sigma-Aldrich) and trimethyl borate and having a dry coating weight of about 100 mg/ft² (1000 mg/m²). The TAC formulation was applied with a multi-slot slide hopper using a mixture of methylene chloride and methanol as the coating solvent.

The cellulose acetate trimellitate has an acid number of 182.

The dried TAC coating was peeled off from the PET carrier substrate at the interface between the front side of the carrier substrate and the layer promoting adhesion of PVA film. The peeling was very smooth and the peeled TAC film had a good appearance that was free from wrinkles. The peeled film is then laminated to a PVA film having a thickness of about 75 micrometers using a glue solution comprising 61.5% water, 38.3% methanol, 0.13% boric acid, and 0.07% zinc chloride. The laminated film was dried in an oven at 60° C. for 10 minutes. The adhesion between the TAC film and the PVA film was excellent (using a manual 180 degree peel test, excellent adhesion implies TAC film could not be separated from PVA film without tearing the TAC film).

Example 2

Example 2 was prepared in a similar manner as Example 1 except that the tie layer comprised a 47.5:47.5:5 mixture of Carboset® 525 (Noveon Inc.), poly(vinyl acetate-co-crotonic acid) (Sigma-Aldrich), and trimethyl borate. The Carboset® 525 having an acid number of about 80 and the poly(vinyl acetate-co-crotonic acid) having an acid number of about 65. The adhesion between the TAC film and the PVA film was excellent.

Comparative Example 3

Example 3 was prepared in a similar manner as Example 1 except that the tie layer comprised a 9:1 mixture of poly(methyl acrylate-co-vinylidene chloride-co-hydroxy ethyl methacrylate) (20/78/2) having an acid number of 0 and Cythane® 3174 (crosslinking agent from Cytec Inc.). The adhesion between the TAC film and the PVA film was poor (using a manual 180 degree peel test, poor adhesion implies TAC film could be separated from PVA film with little or no resistance).

Comparative Example 4

Example 4 was prepared in a similar manner as Example 1 except that the tie layer comprised a 9:1 mixture of poly(ethyl acrylate-co-vinylidene chloride-co-N,N-dimethyl acrylamide) (20/75/5) having an acid number of 0 and Cythane® 3174 (Cytec Inc.). The adhesion between the TAC film and the PVA film was poor.

Comparative Example 5

Example 5 was prepared in a similar manner as Example 1 except that the tie layer comprised polyurethane Desmocoll® 530HV having an acid number of 0 (Cytec Inc.). The adhesion between the TAC film and the PVA film was poor.

Example 6

A 100 micrometer thick poly(ethylene terephthalate) (PET) carrier substrate having an antistatic backing layer (backside) is coated on its front surface with a layer promoting adhesion to PVA film comprising Cervol® 205 PVA (poly(vinyl alcohol) having a degree of hydrolysis of about 88-89%, available from Celanese Corp.) having a dry coating weight of about 75 mg/ft² (750 mg/m²), and Neorez® R-600 (from NeoResins Inc.) having a coating weight of about 25 mg/ft² (250 mg/m²). The dried layer is then overcoated with a tie layer comprising poly(ethyl methacrylate-co-methacrylic acid) (acid number 130) having a dry coating weight of about 100 mg/ft² (1000 mg/m²). The tie layer is overcoated with a triacetyl cellulose (TAC) formulation comprising three layers: a surface layer comprising CA-438-80S (triacetyl cellulose from Eastman Chemical) having a dry coating weight of about 208 mg/ft² (2080 mg/m²), dihexyl cyclohexane dicarboxylate having a dry coating weight of about 20.8 mg/ft² (208 mg/m²), and Surflon® S-8405-S50 (a fluorinated surfactant from Semi Chemical Co. Ltd) having a dry coating weight of about 21 mg/ft² (210 mg/m²); a middle layer comprising CA-438-80S having a dry coating weight of about 1737 mg/ft² (17370 mg/m²), Surflon® S-8405-S50 having a dry coating weight of about 29.5 mg/ft² (295 mg/m²), dihexyl cyclohexane dicarboxylate having a dry coating weight of about 193 mg/ft² (1930 mg/n²), TINUVIN® 8515 UV absorber having a dry coating weight of about 65 mg/ft² (650 mg/m²), and PARSOL® 1789 UV absorber having a dry coating weight of about 6.5 mg/ft² (65 mg/m²); a lower layer comprising a 47.5:47.5:5 mixture Carboset® 525 (Noveon Inc.), poly(vinyl acetate-co-crotonic acid) (Sigma-Aldrich), and trimethyl borate having a dry coating weight of about 100 mg/ft² (1000 mg/m²). The TAC formulation was applied with a multi-slot slide hopper using a mixture of methylene chloride and methanol as the coating solvent.

The dried TAC coating was peeled off from the PET carrier substrate at the interface between the front side of the carrier substrate and the layer promoting adhesion of PVA film. The peeling was very smooth and the peeled TAC film had a good appearance that was free from wrinkles. The peeled film is then laminated to a PVA film having a thickness of about 75 micrometers using a glue solution comprising 61.5% water, 38.3% methanol, 0.13% boric acid, and 0.07% zinc chloride. The laminated film was dried in an oven at 60° C. for 10 minutes. The adhesion between the TAC film and the PVA film was excellent.

Example 7

Example 7 was prepared in a similar manner as Example 6 except that the tie layer comprised poly(ethyl acrylate-co-vinylidene chloride-co-methacrylic acid) (acid number 65). The adhesion between the TAC film and the PVA film was excellent.

Example 8

A 100 micrometer thick poly(ethylene terephthalate) (PET) carrier substrate having an antistatic backing layer (backside) is coated on its front surface with a layer promoting adhesion to PVA film comprising Cervol® 205 PVA (poly(vinyl alcohol) having a degree of hydrolysis of about 88-89%, available from Celanese Corp.) having a dry coating weight of about 75 mg/ft$^2$ (750 mg/m$^2$), and Neorez® R-600 (from NeoResins Inc.) having a coating weight of about 25 mg/ft$^2$ (250 mg/m$^2$). The dried layer is then overcoated with a triacetyl cellulose (TAC) formulation comprising four layers: a surface layer comprising CA-438-80S (triacetyl cellulose from Eastman Chemical) having a dry coating weight of about 208 mg/ft$^2$ (2080 mg/m$^2$), dihexyl cyclohexane dicarboxylate having a dry coating weight of about 20.8 mg/ft$^2$ (208 mg/m$^2$), and Surflon® S-8405-S50 (a fluorinated surfactant from Semi Chemical Co. Ltd) having a dry coating weight of about 21 mg/ft$^2$ (210 mg/m$^2$); a upper mid layer comprising CA-438-80having a dry coating weight of about 1372 mg/ft$^2$ (1320 mg/m$^2$), Surflon® S-8405-S50 having a dry coating weight of about 21 mg/ft$^2$ (210 mg/m$^2$), dihexyl cyclohexane dicarboxylate having a dry coating weight of about 137 mg/ft$^2$ (1370 mg/m$^2$), TINUVIN® 8515 UV absorber having a dry coating weight of about 65 mg/ft$^2$ (650 mg/m$^2$), and PARSOL® 1789 UV absorber having a dry coating weight of about 6.5 mg/ft$^2$ (65 mg/m$^2$); a lower mid layer comprising CAB-171-15 (cellulose acetate butyrate from Eastman Chemical) having a dry coating weight of about 350 mg/ft$^2$ (3500 mg/m$^2$), and a lower layer serving as the tie layer comprising poly(ethyl acrylate-co-vinylidene chloride-co-methacrylic acid) (acid number 65) having a dry coating weight of about 75 mg/ft$^2$ (750 mg/m$^2$). The TAC formulation was applied with a multi-slot slide hopper using a mixture of methylene chloride and methanol as the coating solvent.

The dried TAC coating was peeled off from the PET carrier substrate at the interface between the front side of the carrier substrate and the layer promoting adhesion of PVA film. The peeling was very smooth and the peeled TAC film had a good appearance that was free from wrinkles. The peeled film is then laminated to a PVA film having a thickness of about 75 micrometers using a glue solution comprising 61.5% water, 38.3% methanol, 0.13% boric acid, and 0.07% zinc chloride. The laminated film was dried in an oven at 60° C. for 10 minutes. The adhesion between the TAC film and the PVA film was excellent.

Example 9

Polarizer Durability and Polarization Efficiency

A 100 micrometer thick poly(ethylene terephthalate) (PET) carrier substrate having an antistatic backing layer (backside) is coated on its front surface with a layer promoting adhesion to PVA film comprising Cervol® 205 PVA (poly(vinyl alcohol) having a degree of hydrolysis of about 88-89%, available from Celanese Corp.) having a dry coating weight of about 75 mg/ft$^2$ (750 mg/m$^2$), and Neorez® R-600 (from NeoResins Inc.) having a coating weight of about 25 mg/ft$^2$ (250 mg/m$^2$). The dried layer is then overcoated with a triacetyl cellulose (TAC) formulation comprising three layers: a surface layer comprising CA-438-80S (triacetyl cellulose from Eastman Chemical) having a dry coating weight of about 208 mg/ft$^2$ (2080 mg/m$^2$), diethyl phthalate having a dry coating weight of about 20.8 mg/ft$^2$ (208 mg/m$^2$), and Surflon® S-8405-S50 (a fluorinated surfactant from Semi Chemical Co. Ltd) having a dry coating weight of about 21 mg/ft$^2$ (210 mg/m$^2$); a mid layer comprising CA-438-80S having a dry coating weight of about 1899 mg/ft$^2$ (18990 mg/m$^2$), Surflon® S-8405-S50 having a dry coating weight of about 29.5 mg/ft$^2$ (295 mg/n$^2$), diethyl phthalate having a dry coating weight of about 190 mg/ft$^2$ (1900 mg/m$^2$), TINUVIN® 8515 UV absorber (a mixture of 2-(2'-Hydroxy-3'-tert-butyl-5'-methylphenyl)-5-chloro benzotriazole and 2-(2'-Hydroxy-3',5'-ditert-butylphenyl)-benzotriazole, available from Ciba Specialty Chemicals) having a dry coating weight of about 42 mg/ft$^2$ (420 mg/m$^2$), and PARSOL® 1789 UV absorber (4-(1,1-dimethylethyl)-4'-methoxydibenzoylmethane, available from Roche Vitamins Inc.) having a dry coating weight of about 4.2 mg/ft$^2$ (42 mg/m$^2$); a lower layer as the tie layer comprising a mixture of 95:5 cellulose acetate trimellitate (Sigma-Aldrich) and trimethyl borate and having a dry coating weight of about 100 mg/ft$^2$ (1000 mg/m$^2$). The TAC formulation was applied with a multi-slot slide hopper using a mixture of methylene chloride and methanol as the coating solvent.

The dried TAC coating was peeled off from the PET carrier substrate at the interface between the front side of the carrier substrate and the layer promoting adhesion of PVA film. The peeling was very smooth and the peeled TAC film had a good appearance that was free from wrinkles. The peeled film is then laminated to a polarizer film on both sides. The polarizer film comprised an oriented poly(vinyl alcohol) film dyed with I$_2$/KI, crosslinked with boric acid, and having a thickness of about 25 micrometers and initial polarization efficiency of about 99.9%. The lamination was carried out using a glue solution comprising 61.5% water, 38.3% methanol, 0.13% boric acid, and 0.07% zinc chloride. The laminated film was dried in an oven at 60° C. for 10 minutes.

The laminated polarizer plate was then glued on one side to Corning Type 1737-G glass using an optical grade pressure sensitive adhesive and placed in a 60° C./90% RH environmental chamber for 500 hrs. After the 500 hours there was no delamination or peeling from the edge and the polarization efficiency is greater than 99.6%.

Example 10

Polarizer Durability and Polarization Efficiency

Example 10 was prepared in a similar manner as Example 9 except that butoxycarbonylmethyl butyl phthalate was used instead of diethyl phthalate and the mid layer comprised TINUVIN® 8515 UV absorber having a dry coating weight of about 84 mg/ft$^2$ (840 mg/m$^2$), and PARSOL® 1789 UV absorber having a dry coating weight of about 8.4 mg/ft$^2$ (84 mg/m$^2$).

The laminated polarizer plate showed no observed premature delamination from the edge and polarization efficiency remained greater than 99.6% after 1000 hrs incubation in a 60° C./90% RH environmental chamber.

The above examples clearly demonstrate that the present invention has overcome the limitations of prior art polarizer cover sheets and eliminated the need for complex surface treatments such as saponification prior to the fabrication of polarizer plates.

The invention has been described in detail with particular reference to certain preferred embodiments thereof, but it will be understood that variations and modifications can be effected within the spirit and scope of the invention.

PARTS LIST

10 coating and drying system
12 moving substrate/web
14 dryer
16 coating apparatus 18 unwinding station
20 back-up roller
22 coated substrate
24 guarded cover sheet composite
26 wind-up station
28 coating supply vessel
30 coating supply vessel
32 coating supply vessel
34 coating supply vessel
36 pump
38 pump
40 pump
42 pump
44 conduit
46 conduit
48 conduit
50 conduit
52 discharge device
54 polar charge assist device
56 nip roller
58 nip roller
60 preformed-protection layer
62 unwinding station
64 wind-up station
66 drying section

PARTS LIST—CONTINUED 68 drying section
70 drying section
72 drying section
74 drying section
76 drying section
78 drying section
80 drying section
82 drying section
92 front section
94 second section
96 third section
98 fourth section
100 back plate
102 inlet
104 $1^{st}$ metering slot
106 pump
108 lowermost layer
110 inlet
112 $2^{nd}$ metering slot
114 pump
116 layer
118 inlet
120 metering slot
122 pump
124 layer
126 inlet
128 metering slot
130 pump
132 layer

PARTS LIST—CONTINUED 134 inclined slide surface
136 coating lip
138 $2^{nd}$ inclined slide surface
140 $3^{rd}$ inclined slide surface
142 $4^{th}$ inclined slide surface
144 back land surface
146 coating bead 151 guarded cover sheet composite
153 guarded cover sheet composite
159 guarded cover sheet composite
162 lowermost layer
164 intermediate layer
166 intermediate layer
168 uppermost layer
170 carrier substrate
171 coversheet
173 cover sheet
174 lowermost layer
176 intermediate layer
178 intermediate layer
179 cover sheet
180 uppermost layer
182 carrier substrate
184 release layer
186 lowermost layer
187 intermediate layer
188 intermediate layer
189 cover sheet
190 uppermost layer

PARTS LIST—CONTINUED 200 feed line
202 extrusion hopper
204 pressurized tank
206 pump
208 metal drum
210 first drying section
212 drying oven
214 cast polymer film
216 final drying section
218 final dried film
220 wind-up station
232 guarded cover sheet composite supply roll
234 guarded cover sheet composite supply roll
236 PVA dichroic film supply roll
240 carrier substrate take-up roll
242 pinch roller
244 pinch roller
250 polarizer plate
252 polarizer plate
254 polarizer plate
260 LCD cell
261 layer promoting adhesion to PVA
262 tie layer
264 low birefringence protective polymer film
266 barrier layer
268 antiglare layer
272 viewing angle compensation layer

What is claimed is:

1. A method of forming a polarizing plate comprising:
    (a) providing two cover sheets, each cover sheet comprising a low birefringence protective polymer films, comprising cellulose ester and having an in-plane birefringence $\Delta n_{in}$ of less than about $1 \times 10^{-4}$ and an out-of-lane birefringence $\Delta n_{in}$ of from 0.005 to −0.005, and a layer promoting adhesion to poly(vinyl alcohol)-containing films that comprises a hydrophilic polymer;
    (b) providing a PVA dichroic polarizing film; and
    (c) simultaneously or sequentially bringing said two cover sheets into contact with said PVA dichroic polarizing film such that said layer promoting adhesion to poly (vinyl alcohol)-containing films in each of said two cover sheets is in contact with said PVA dicliroic polarizing film, wherein prior to contact a glue composition is applied to said PVA dichroic polarizing film supplied from a supply reel or said two cover sheets entering a nip between pinch rollers, and wherein said glue composition is substantially free of dissolved polymer and comprises, for crosslinking PVA, a first crosslinking agent that comprises boron and a second crosslinking agent that comprises multivalent ion.

2. The method of claim 1 wherein said glue composition is free of dissolved polymer and comprises a crosslinking agent that crosslinks PVA.

3. The method of claim 1 wherein said glue composition is applied to both sides of the PVA dichroic polarizing film or to a lowermost layer of said two cover sheets prior to said two cover sheets and said PVA dichroic polarizing film entering a nip between pinch rollers wherein said two cover sheets are laminated to either side of said PVA dichroic polarizing film, with application of pressure and optional heat, between opposing pinch rollers, resulting in said polarizer plate in sheet form.

4. The method of claim 1 wherein said glue composition further comprises an organic crosslinking agent.

5. The method of claim 1 wherein said second crosslinking agent comprises a coordination compound comprising titanium or zirconium.

6. A method of forming a polarizing plate comprising:
(a) providing two guarded cover sheet composites each comprising a carrier substrate and a protective cover sheet that comprises a low birefringence protective polymer film, comprising cellulose ester and having an in-plane birefringence $\Delta n_{in}$ of less than about $1 \times 10^{-4}$ and an out-of-plane birefringence $\Delta n_{th}$ of from 0.005 to −0.005, and a layer promoting adhesion to poly(vinyl alcohol)-containing films that comprises a hydrophilic polymer;
(b) optionally removing said carrier substrates from said protective cover sheet to provide two unguarded cover sheets;
(c) providing a PVA dichroic film; and
(d) simultaneously or sequentially bringing said unguarded or guarded cover sheets into contact with said PVA dichroic film such that said layer promoting adhesion to poly(vinyl alcohol)-containing films in each of said two cover sheets is in contact with said PVA dichroic film, wherein a glue composition is applied to said PVA dichroic film supplied from a supply reel or said cover sheets entering a nip between pinch rollers, and wherein prior to contact said glue composition is substantially free of dissolved polymer and comprises, for crosslinking poly(vinyl alcohol), a first crosslinking agent that comprises boron and a second crosslinking agent that comprises multivalent ion.

7. The method of claim 6 wherein said glue composition further comprises an organic crosslinking agent.

\* \* \* \* \*

UNITED STATES PATENT AND TRADEMARK OFFICE
CERTIFICATE OF CORRECTION

PATENT NO. : 7,399,376 B2
APPLICATION NO. : 11/028036
DATED : July 15, 2008
INVENTOR(S) : Yongcai Wang et al.

It is certified that error appears in the above-identified patent and that said Letters Patent is hereby corrected as shown below:

| | |
|---|---|
| Col. 38, line 56 | In Claim 1, delete "films" and insert -- film --, therefor. |
| Col. 38, line 58 | In Claim 1, delete "lane" and insert -- plane --, therefor. |
| Col. 38, line 59 | In Claim 1, delete "$\Delta n_{in}$" and insert -- $\Delta n_{th}$ --, therefor. |
| Col. 38, line 67 | In Claim 1, delete "dicliroic" and insert -- dichroic --, therefor. |

Signed and Sealed this

Sixth Day of January, 2009

JON W. DUDAS
*Director of the United States Patent and Trademark Office*